(12) United States Patent
Cain et al.

(10) Patent No.: US 10,060,777 B2
(45) Date of Patent: Aug. 28, 2018

(54) APPARATUS AND METHOD FOR NON-INTRUSIVE OFF-BODY MEASUREMENTS IN HYPERSONIC FLIGHT EXPERIMENTS

(71) Applicants: Alan B Cain, Chesterfield, MO (US); Stanislav Gordeyev, Notre Dame, IN (US); R. Mark Rennie, Notre Dame, IN (US)

(72) Inventors: Alan B Cain, Chesterfield, MO (US); Stanislav Gordeyev, Notre Dame, IN (US); R. Mark Rennie, Notre Dame, IN (US)

(*) Notice: Subject to any disclaimer, the term of this patent is extended or adjusted under 35 U.S.C. 154(b) by 162 days.

(21) Appl. No.: 15/146,805

(22) Filed: May 4, 2016

(65) Prior Publication Data
US 2016/0327448 A1 Nov. 10, 2016

Related U.S. Application Data

(60) Provisional application No. 62/157,438, filed on May 5, 2015.

(51) Int. Cl.
*G01M 9/06* (2006.01)
*G01F 1/66* (2006.01)

(52) U.S. Cl.
CPC ............. *G01F 1/661* (2013.01); *G01M 9/065* (2013.01); *G01M 9/067* (2013.01)

(58) Field of Classification Search
CPC ....... G01F 1/661; G01M 9/065; G01M 9/067; G01M 9/06
(Continued)

(56) References Cited

U.S. PATENT DOCUMENTS 5,751,416 A 5/1998 Singh et al.
7,394,537 B1 7/2008 Lindfors et al.
(Continued)

FOREIGN PATENT DOCUMENTS

WO WO2008092129 A2 7/2008
WO WO2011120086 A1 10/2011

OTHER PUBLICATIONS

Jagdish P. Singh, Hansheng Zhang, Fang-Yu Yueh, and Kevin P. Carney, "Investigation of the Effects of Atmospheric Conditions on the Quantification of Metal Hydrides Using Laser-Induced Breakdown Spectroscopy," Applied Spectroscopy, vol. 50, Issue 6, pp. 764-773, (1996).
(Continued)

*Primary Examiner* — Francis Gray
(74) *Attorney, Agent, or Firm* — Wright Law Group, PLLC; Mark F. Wright

(57) ABSTRACT

An "air-data probe" system measures at least one component of freestream velocity by tracking the motion of a laser-induced breakdown ("LIB") spark created in a freestream flow. Neutral density filters are positioned or deployed so that the brightness of the initial LIB spark doesn't over saturate the LIB sensor system. This allows for more consistent tracking of the LIB spark throughout the duration of the LIB spark, including the later stages where the LIB spark is not nearly as bright as the initial LIB spark, thereby allowing all or substantially all of the light generated by the LIB spark to reach the sensors. This provides for enhanced visibility and more accurate detection of the LIB spark over time and as air density changes.

22 Claims, 29 Drawing Sheets

(58) Field of Classification Search
IPC .................................................. G01M 09/06
See application file for complete search history.

(56) References Cited

U.S. PATENT DOCUMENTS

| | | | |
|---|---|---|---|
| 7,560,869 B2 | 7/2009 | Miles et al. | |
| 9,797,776 B2* | 10/2017 | Wang | G01J 3/443 |
| 2002/0149768 A1* | 10/2002 | Sabsabi | G01N 21/15 |
| | | | 356/318 |
| 2005/0200843 A1* | 9/2005 | Kumar | A61B 5/0075 |
| | | | 356/318 |
| 2006/0175312 A1* | 8/2006 | Troitski | B44F 1/00 |
| | | | 219/121.85 |
| 2009/0103083 A1* | 4/2009 | Kremeyer | G01N 21/1702 |
| | | | 356/317 |
| 2011/0246145 A1* | 10/2011 | Multari | G01J 3/28 |
| | | | 703/2 |
| 2013/0016349 A1* | 1/2013 | Effenberger, Jr. | G01J 3/18 |
| | | | 356/318 |

OTHER PUBLICATIONS

Kimmel, R., Adamczak, D., Berger, K., and Choudhari, M., "HIFiRE-5 Flight Vehicle Design," AIAA Paper 2010-4985, Jun. 2010.

Kimmel, R., Adamczak, D., and Gosse, R., "Ground Test and Computation of Boundary Layer Transition on the Hypersonic International Flight research and Experimentation (HIFiRE)-5 Vehicle," AFRL-RB-WP-TR-2011-3025, Feb. 2011.

Cress, J., Gordeyev, S., and Jumper, E.J., "Aero-Optical Measurements in a Heated, Subsonic, Turbulent Boundary Layer", 48th Aerospace Science Meeting and Exhibit, Orlando, Florida, Jan. 4-7, 2010, AIAA Paper 2010-0434.

Cress, J., "Optical Abberations Caused by Coherent Structures in a Subsonic, Compressible, Turbulent Boundary Layer," Ph.D. Thesis, University of Notre Dame, 2010.

Gordeyev, S., Jumper, E.J., and Hayden, T.E., "Aero-Optical Effects of Supersonic Boundary Layers," AIAA Journal, vol. 50, No. 3, pp. 682-690, 2012.

Chen, Y.L, Lewis, J.W.L., and Parigger, C., "Spatial and temporal profiles of pulsed laser-induced air plasma emission," Journal of Quantitative Spectroscopy and Radiative Transfer, vol. 67, 2000, pp. 91-103.

Gordeyev, S., Rennie, R.M., Cain, A.B., and Hayden, T.E., "Aero-Optical Measurements of High-Mach Supersonic Boundary Layers," AIAA 2015-3246, 2015.

Smith, A.E., Gordeyev, S., Ahmed, H., Ahmed, A., Wittich, D.J., and Paul, M., "Shack-Hartmann Wavefront Measurements of Supersonic Turbulent Boundary Layers in the TGF," AIAA Paper 2014-2493, 2010.

* cited by examiner

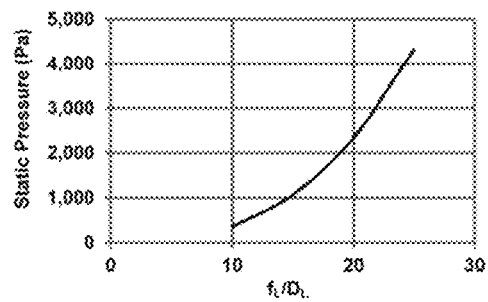
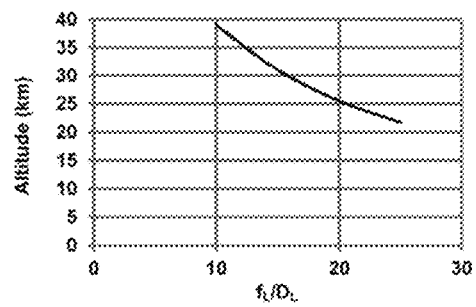
FIG. 6A　　　　　　　　　　　FIG. 6B
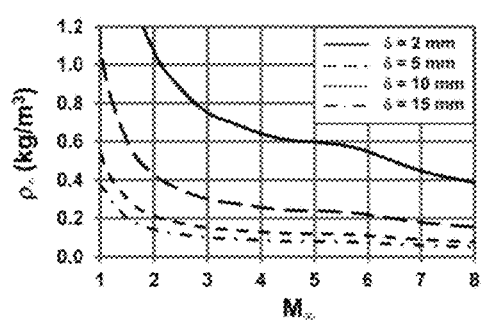
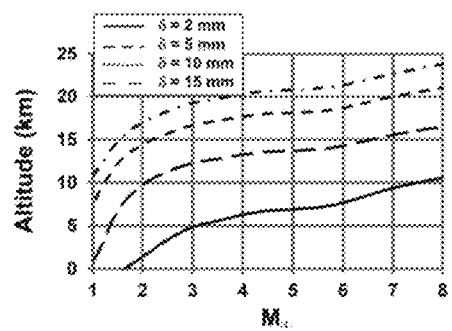
FIG. 7A　　　　　　　　　　　FIG. 7B

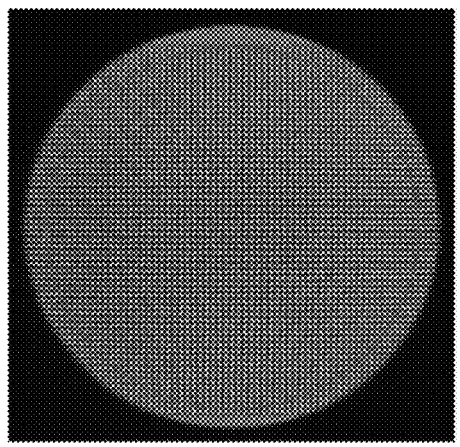 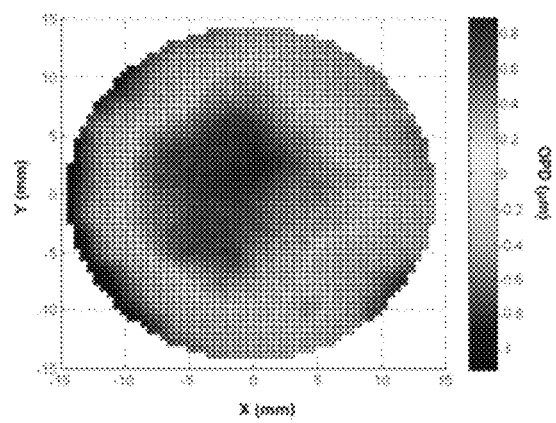
FIG. 9A                    FIG. 9B

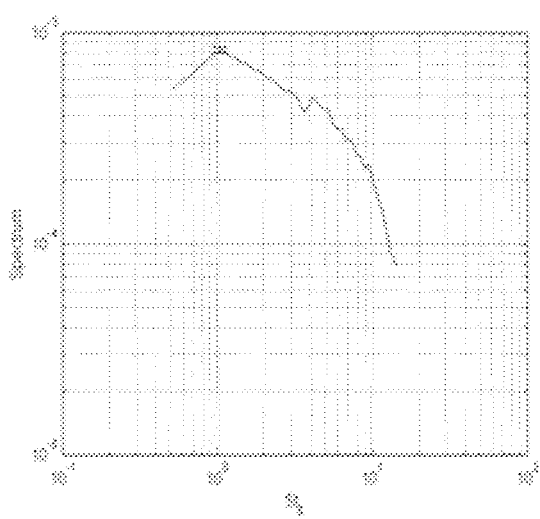 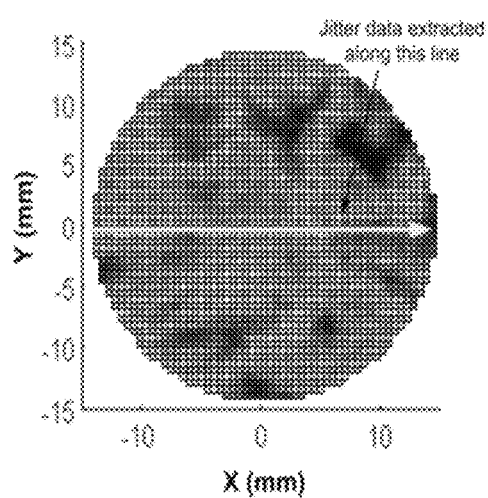
FIG. 15A                    FIG. 15B

APPARATUS AND METHOD FOR NON-INTRUSIVE OFF-BODY MEASUREMENTS IN HYPERSONIC FLIGHT EXPERIMENTS

STATEMENT REGARDING GOVERNMENT SPONSORED RESEARCH

The United States Government has a paid-up license in this invention and the right in limited circumstances to require the patent owner to license others on reasonable terms provided for by the terms of grand numbers FA9550-13-C-0010 and FA9550-11-C-0091 awarded by the United States Air Force.

BACKGROUND OF THE INVENTION

1. Technical Field

The present invention relates generally to hypersonic flight and more specifically relates to the method of making precise measurements of high-speed flow for hypersonic flight testing environments with reduced uncertainty.

2. Background Art

Several development programs for new hypersonic flight vehicles are currently underway. To facilitate these programs, hypersonic test programs are being conducted to enhance understanding of high-speed flows so as to enable improved prediction and design capabilities. A key objective of hypersonic flight-testing programs is the ability to measure boundary-layer parameters at hypersonic speeds. This kind of fluid-mechanic understanding cannot be readily obtained from standard and commonly known ground-test and computational fluid dynamics (CFD) efforts alone, since ground-test facilities are not capable of achieving all points in the flight envelope of realistic flight-vehicle designs, while CFD simulations require validation data.

One of the difficulties associated with hypersonic flight-test measurements is the present lack of reliable instrumentation for the accurate measurement of fundamental flight-path data, including windspeed, pitch and yaw. These measurements are critical for the correct interpretation of data acquired during the test and development process for hypersonic aircraft. As a result, hypersonic flight-test programs are underway with the specific objective of acquiring flow data on hypersonic test vehicles.

To meet the objectives of these tests, and hence the instrumentation used to acquire the data, the data should meet several requirements; specifically, the measurements should: have high spatial and temporal resolution to accurately capture the high frequency content of hypersonic flows; be relatively nonintrusive, and; sample the flow at locations that are off the body of the test vehicle. Finally, the instruments should also be suited for the flight-test environment where space and installation options are limited.

In summary, hypersonic test programs would greatly benefit from the development of innovative instrumentation that is specifically designed to meet the needs of hypersonic flight test. Accordingly, without improving the state of the art for precise measuring of variables such as windspeed and flow angles in a hypersonic environment, the ability to test and develop hypersonic flight vehicles suitable for various applications will continue to be sub-optimal.

BRIEF SUMMARY OF THE INVENTION

An apparatus and method for measuring at least three components of velocity and associated flow angles by optical tracking of the light emitted by a laser-induced breakdown (LIB) spark is described. Laser-induced breakdown spectroscopy (LIBS) is a type of atomic emission spectroscopy that uses a highly energetic laser pulse as the excitation source. The laser is focused to form plasma (spark), which atomizes and excites samples. The LIB spark is used as a beacon for optical measurements described in this invention. The advantage of the LIB spark is that it can be created at any point in space outside of the test vehicle, thereby providing enhanced flexibility for optical measurements.

In the most preferred embodiments of the present invention, a novel "air-data probe" measures three components of freestream velocity by tracking the motion of a laser-induced breakdown spark that is created in the freestream flow outside of the hypersonic vehicle shock. The most preferred embodiments of the present invention are configured to operate over a very large dynamic range of spark brightness. This is primarily accomplished by the creative use of neutral density filters so that the brightness of the initial LIB spark doesn't over saturate the LIB sensor system. This allows for more consistent tracking of the LIB spark throughout the duration of the LIB spark, including the later stages where the LIB spark is not nearly as bright thereby allowing all or substantially all of the light generated by the LIB spark to reach the sensors. This provides for enhanced visibility and more accurate positioning for detection of the LIB spark over time.

Measurements performed in a blowdown wind tunnel at a nominal flow Mach number of 4.38 demonstrate that flow velocity could be accurately measured using one or more of the preferred embodiments of the present invention, with a demonstrated flow-angle uncertainty of less than ±0.2° for a Mach 4.38 test condition. Wavefront measurements taken through the shock of a 20° wedge demonstrate that measurements of velocity and associated flow angles could also be performed through a shock with negligible effect on spark formation due to the much smaller aperture of the LIB laser beam in relation to the wavelength of the shock aero-optical effect.

One preferred embodiment of the present invention discloses a method for obtaining velocity and associated flow angles by measuring the aero-optic signature of the boundary layer imposed on a transitioning beam of light. Given that the strength and spectrum of the optical aberration imposed by the boundary layer are related to the boundary-layer thickness, local convection velocity and density as well as other parameters, it is possible to extract this information via careful analysis of the optical data. Furthermore, the measurement technique used in the various preferred embodiments of the present invention can be made fully non-intrusive if an LIB spark, created by focusing the output of an on-board laser, is used to illuminate the boundary-layer flow of interest.

BRIEF DESCRIPTION OF THE DRAWINGS

The various embodiments of the present invention will hereinafter be described in conjunction with the appended drawings, wherein like designations denote like elements, and.

Figure 3A:
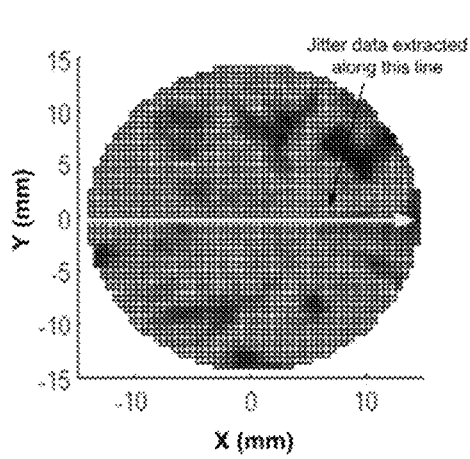
Figure 3B:
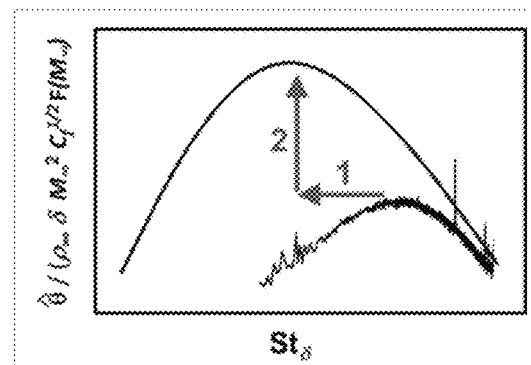
Figure 4:
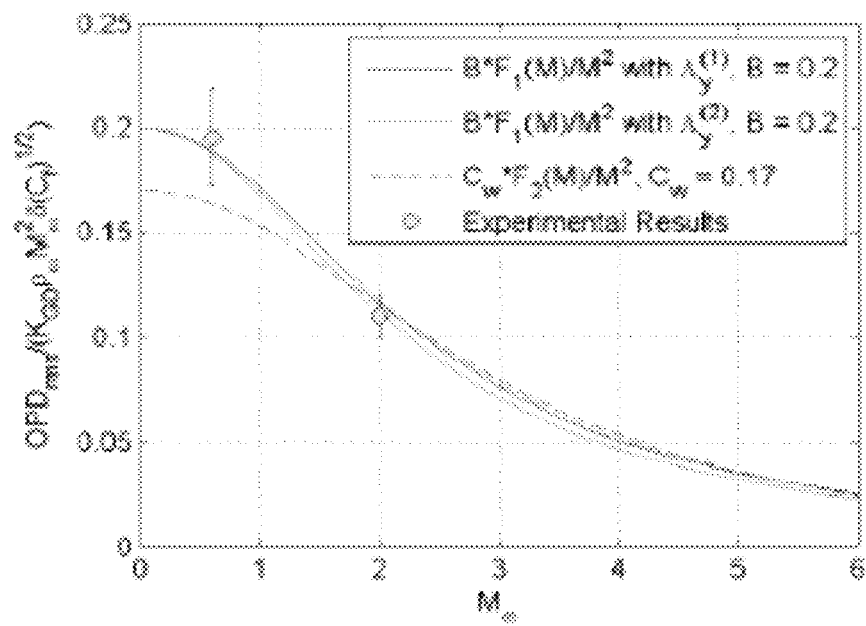
Figure 5:
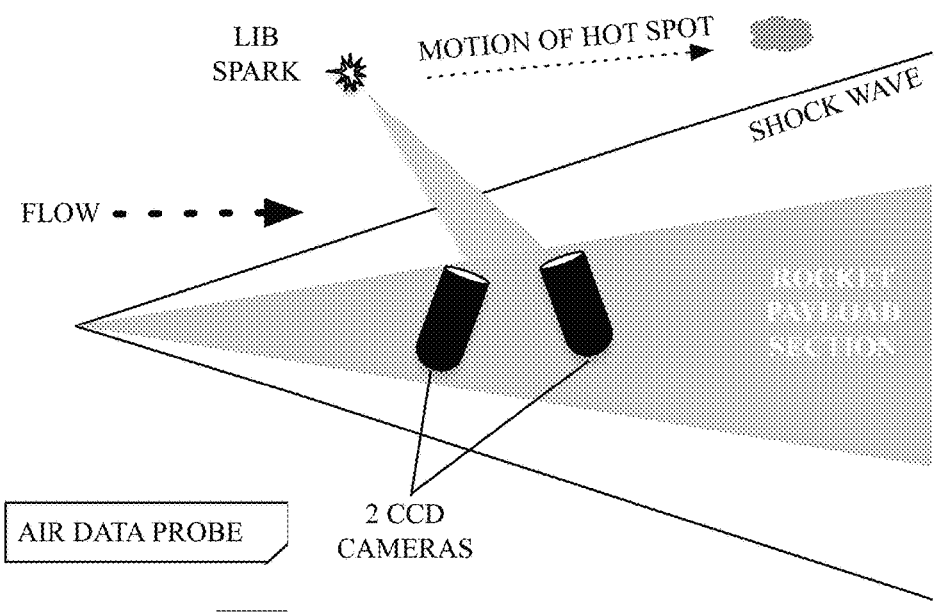
Figure 8:
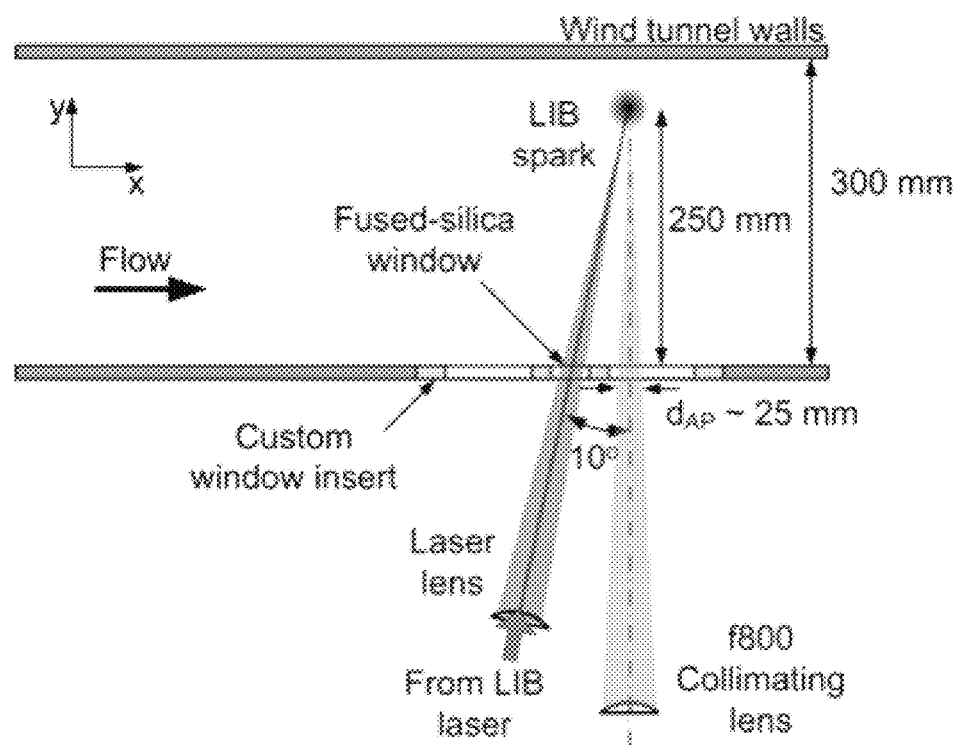
Figure 10:
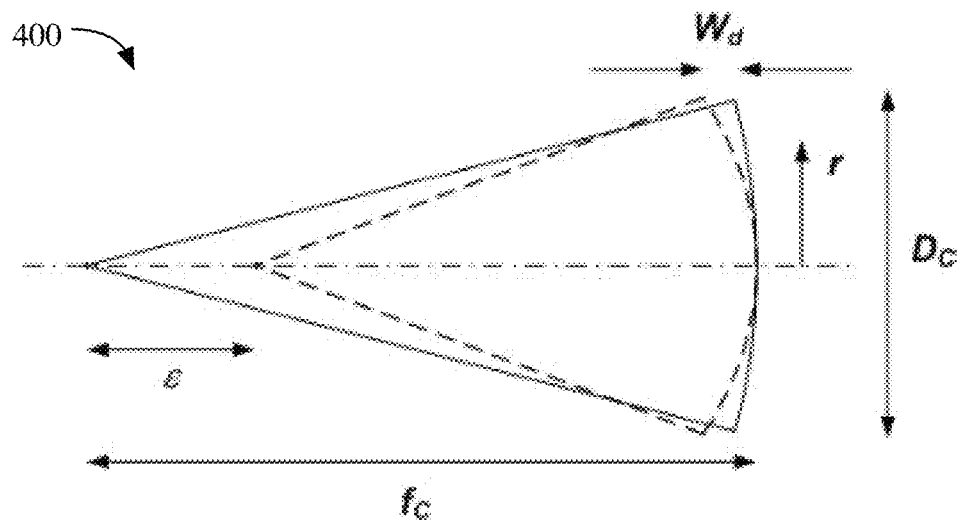
Figure 11:
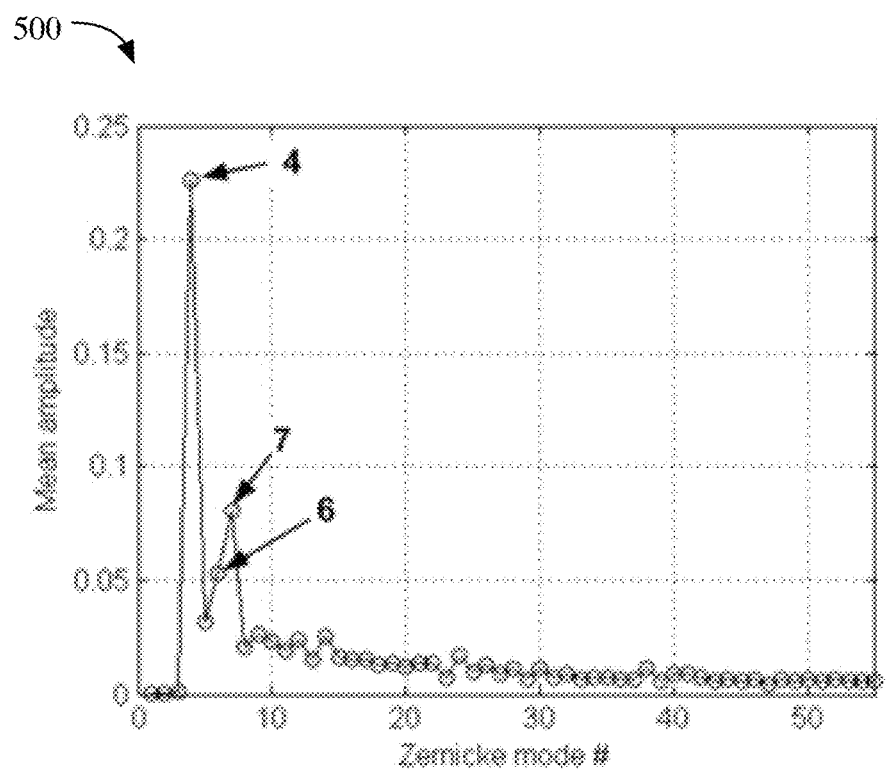
Figure 12:
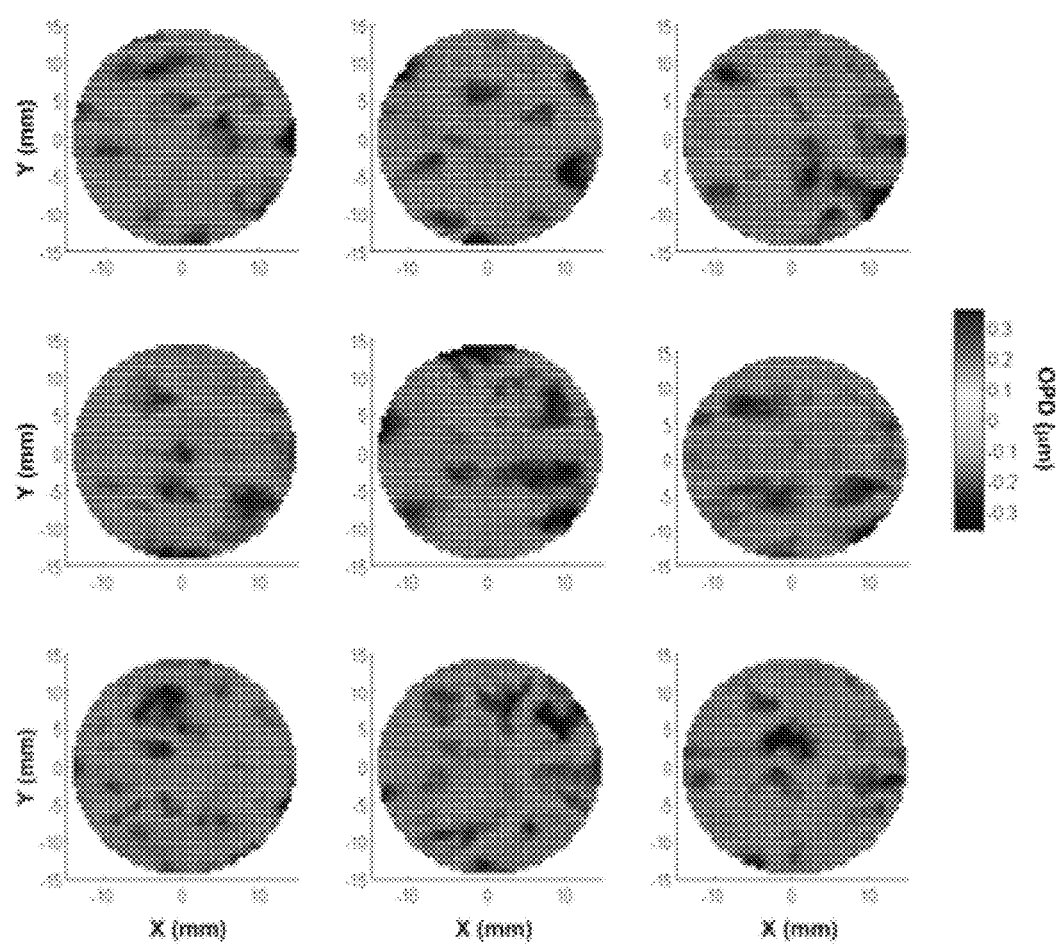
Figure 13:
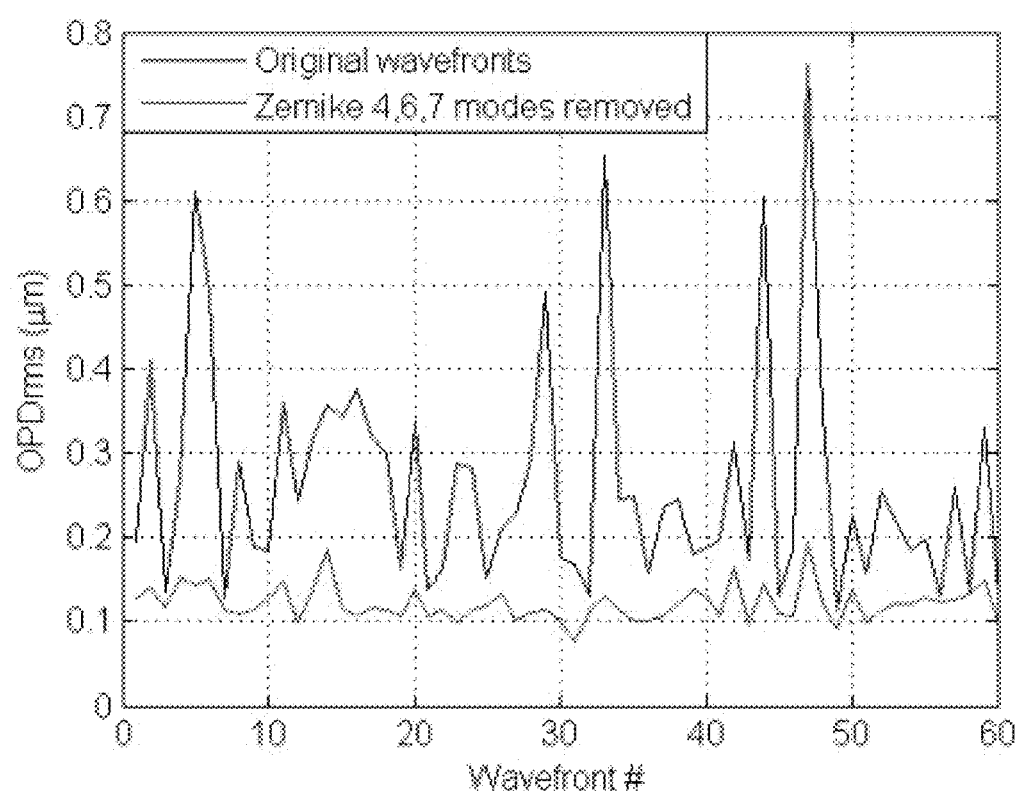
Figure 14:
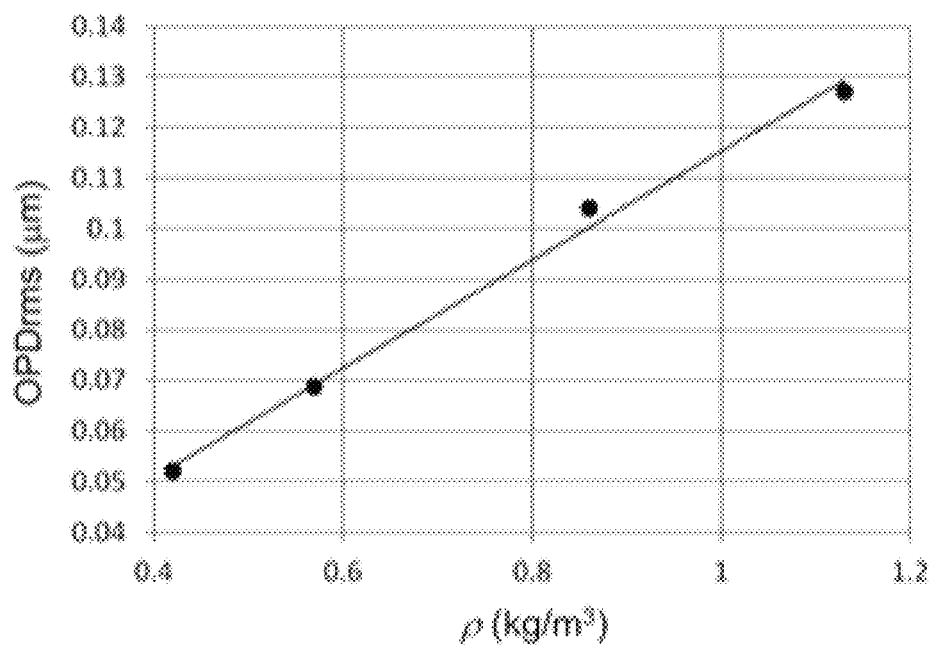
Figure 16:
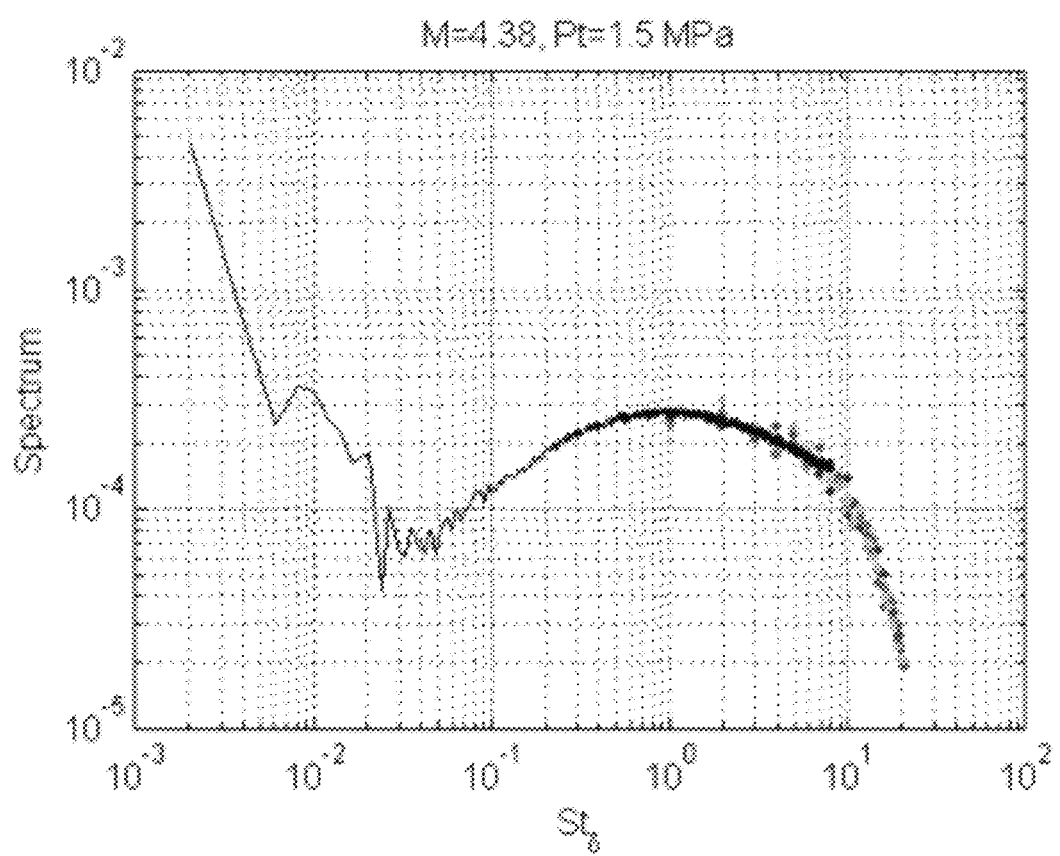
Figure 17:
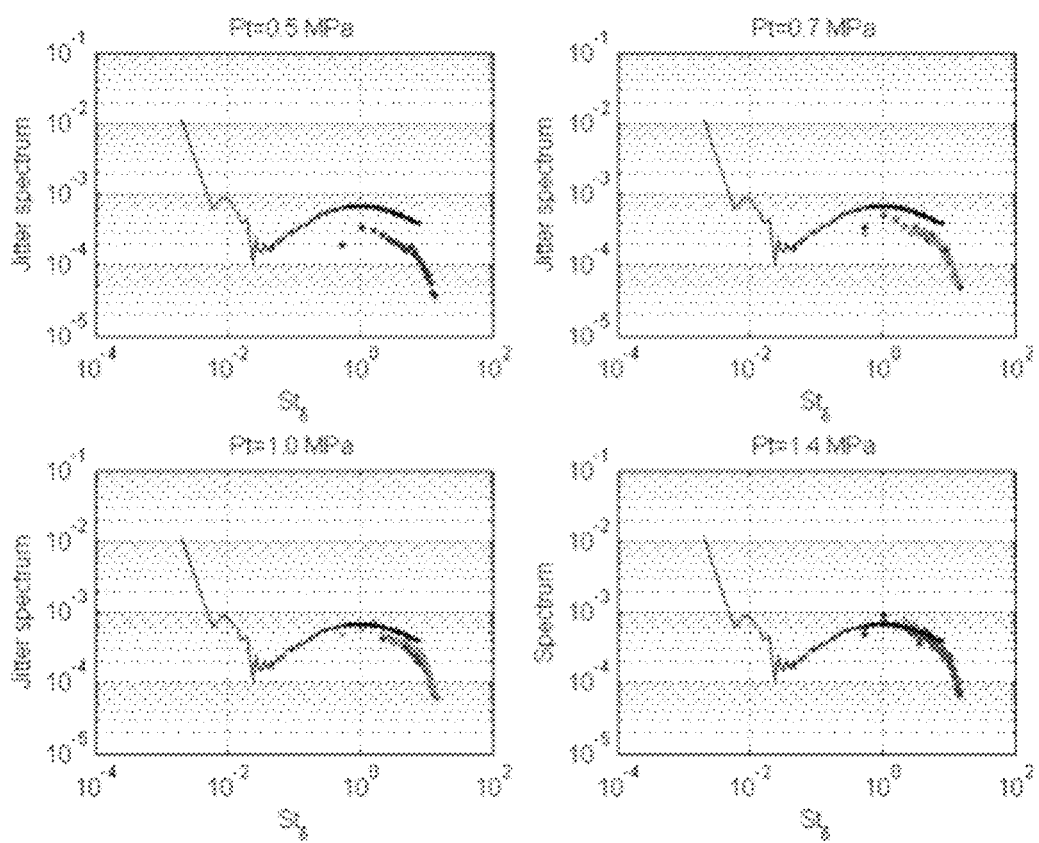
Figure 18:
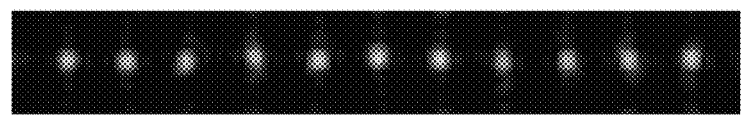
Figure 19:
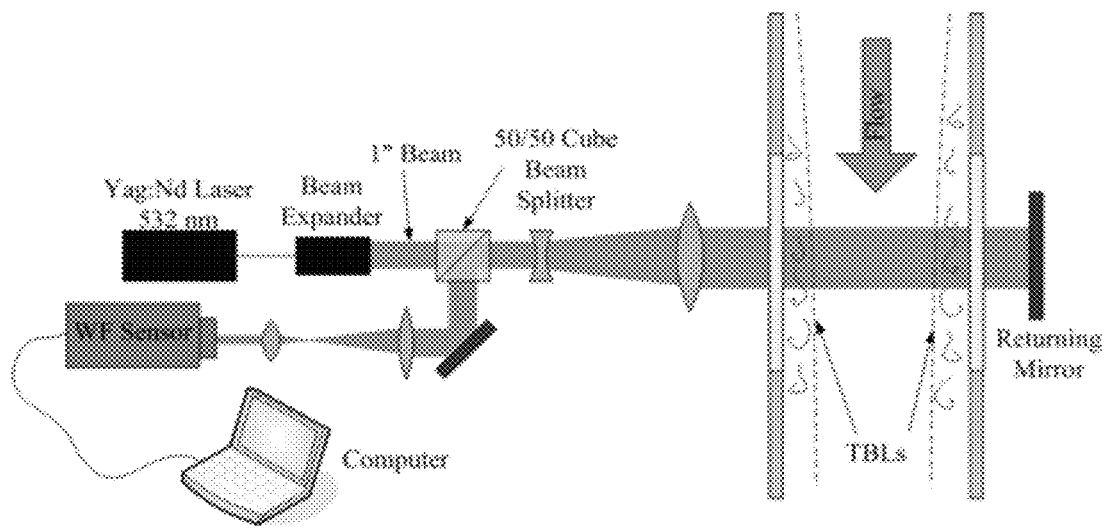
Figure 20:
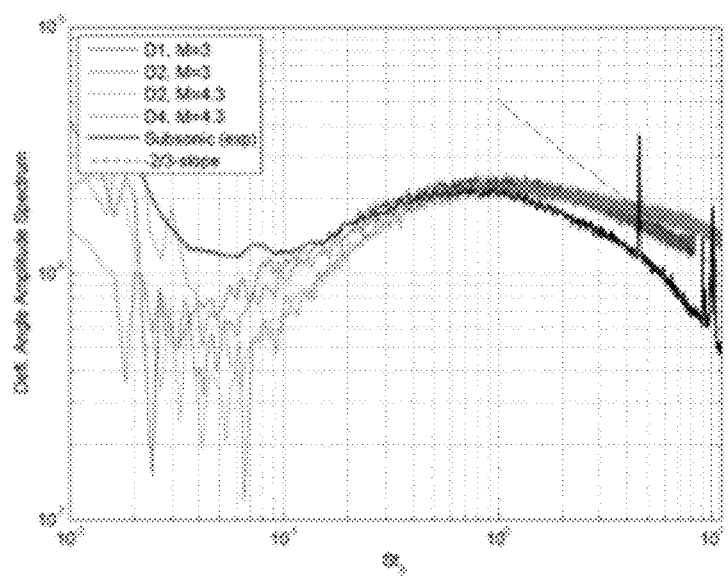
Figure 21:
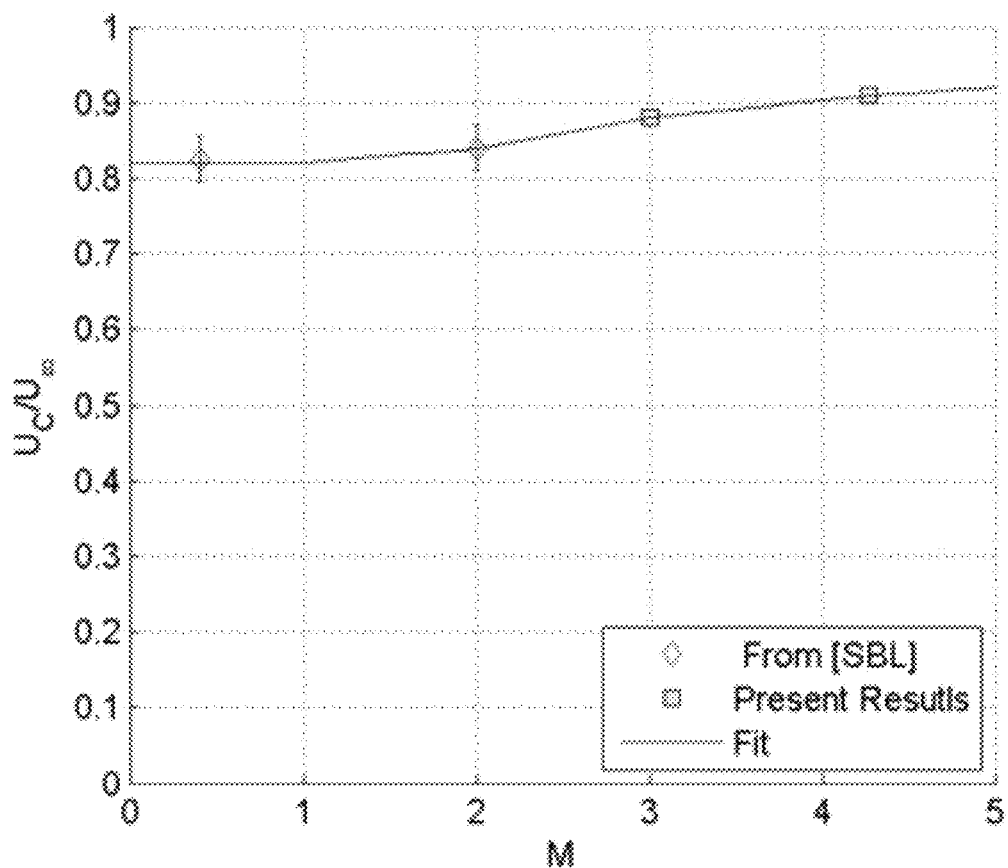
Figure 22:
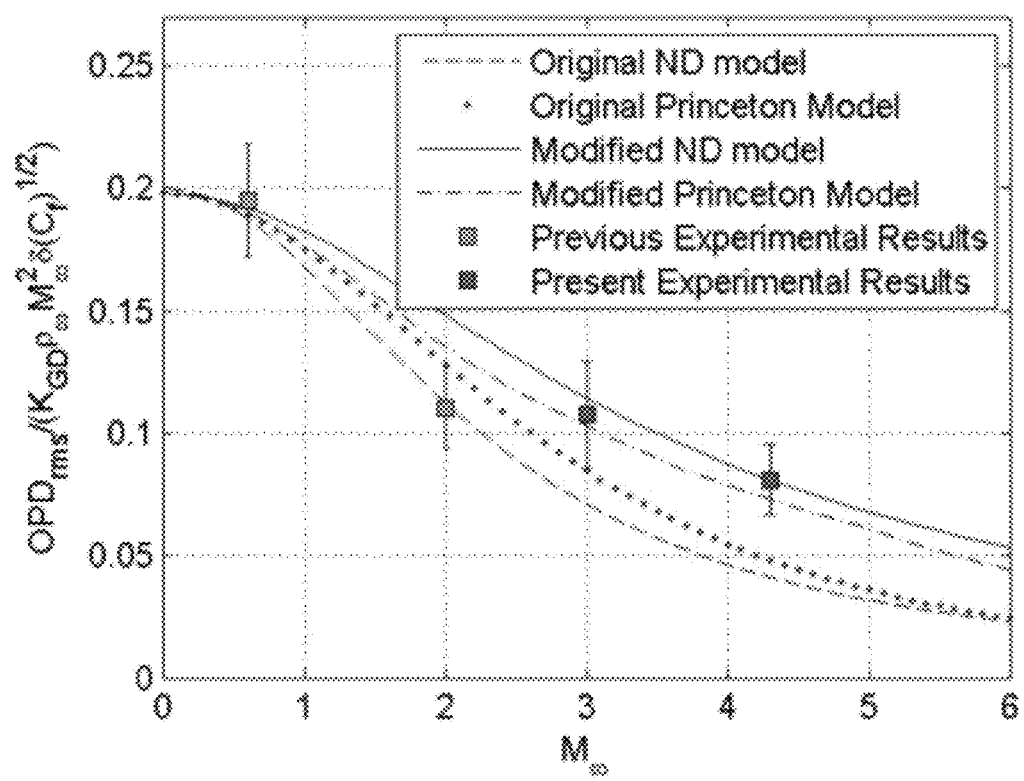
Figure 23:
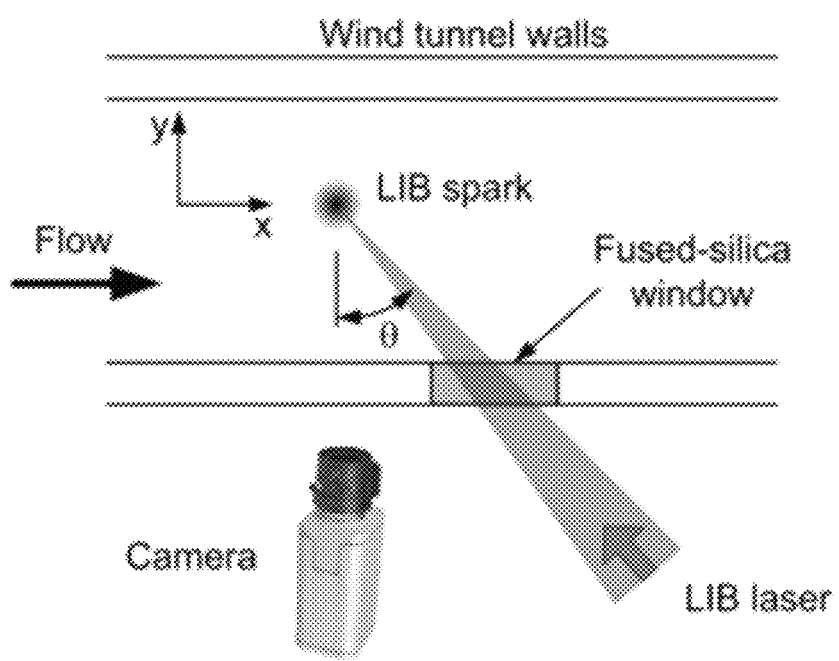
Figure 23A:
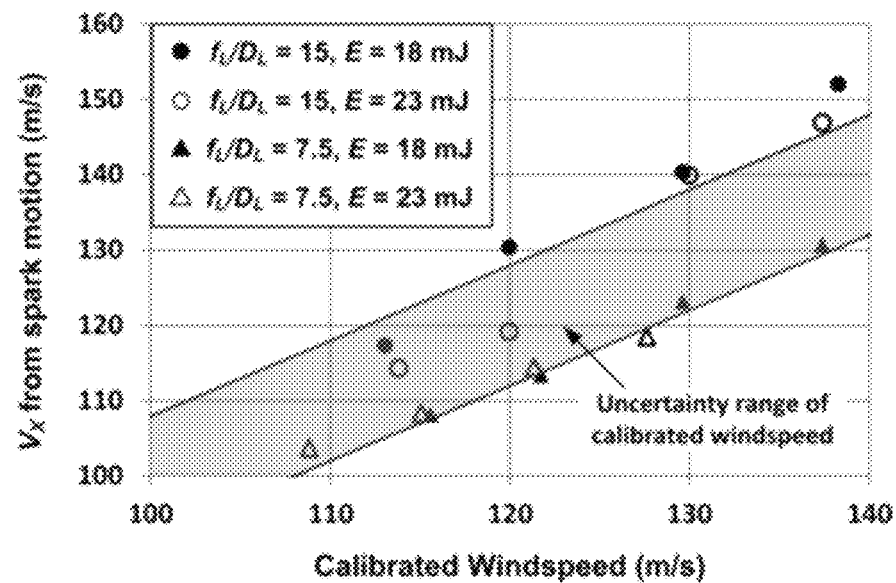
Figure 23B:
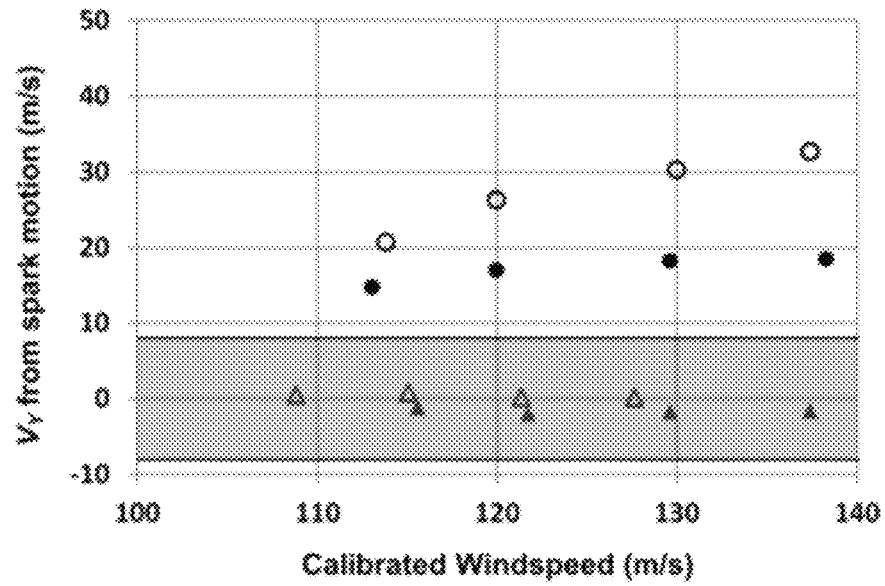
Figure 24A:
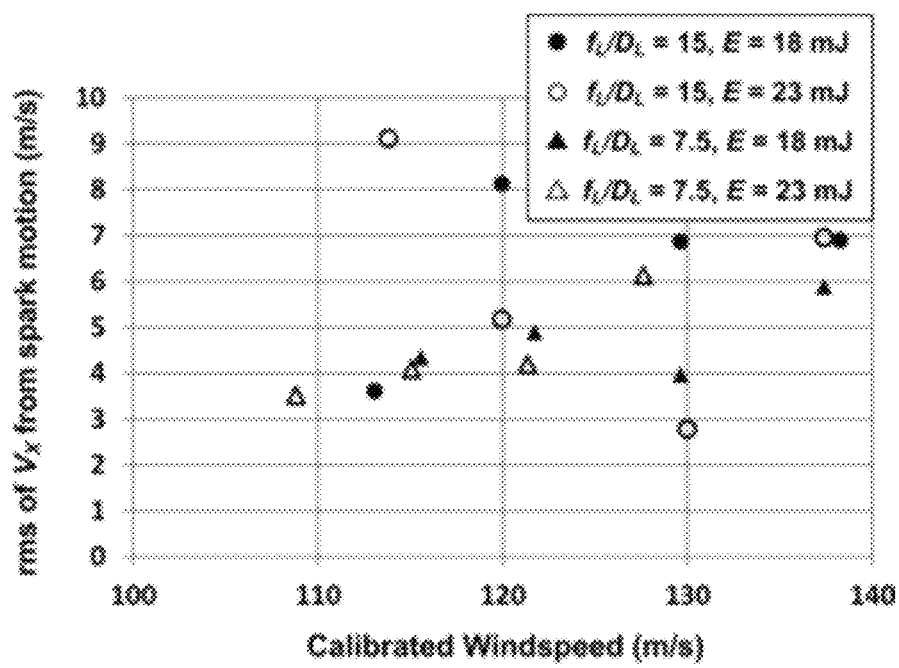
Figure 24B:
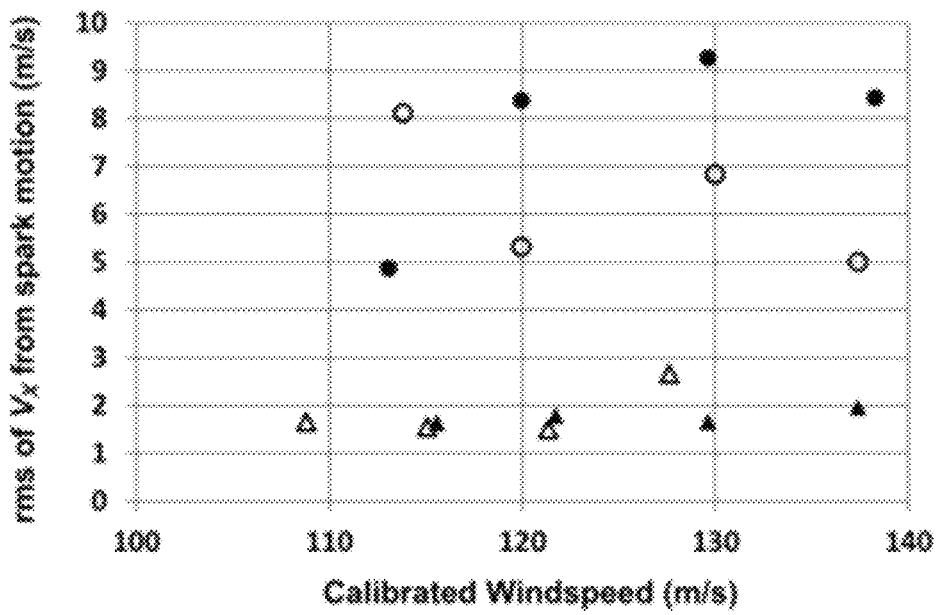
Figure 25:
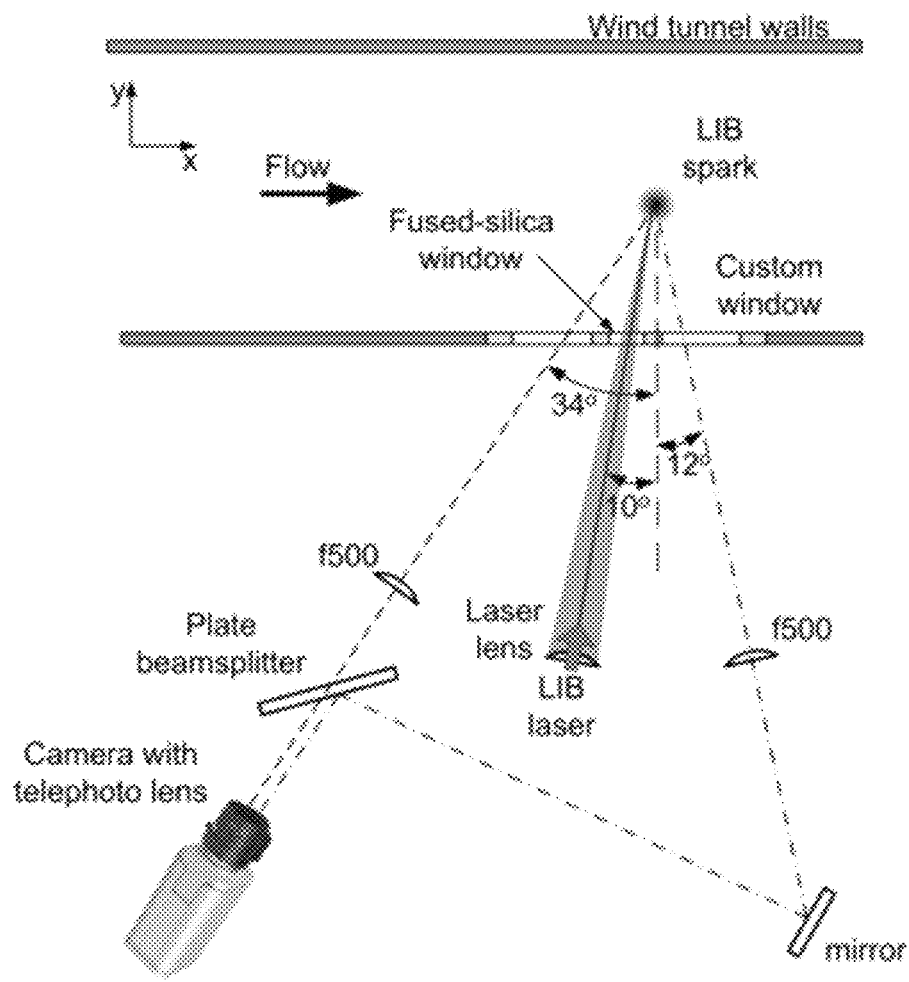
Figure 26:
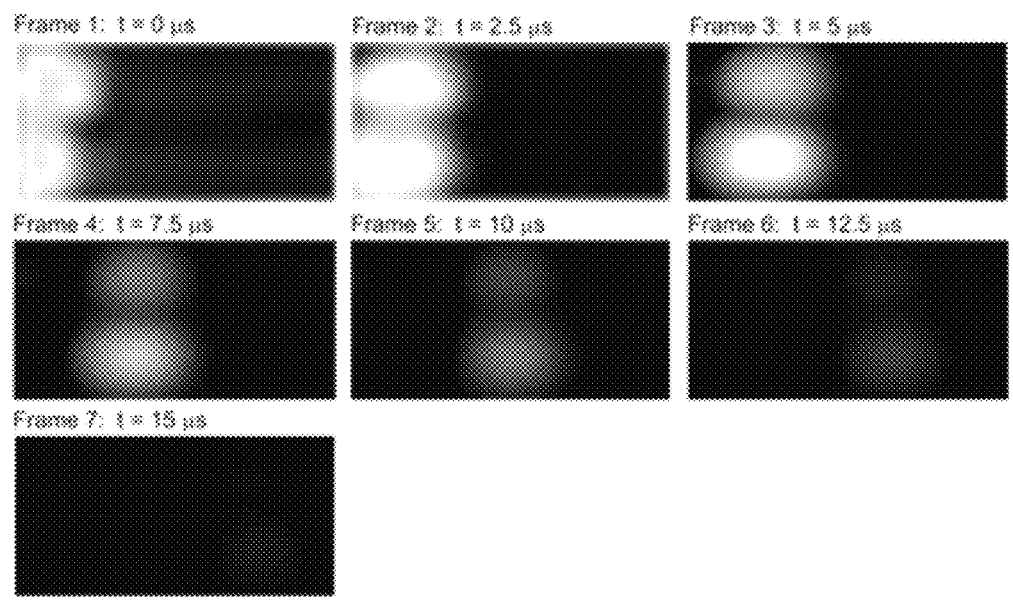
Figure 27:
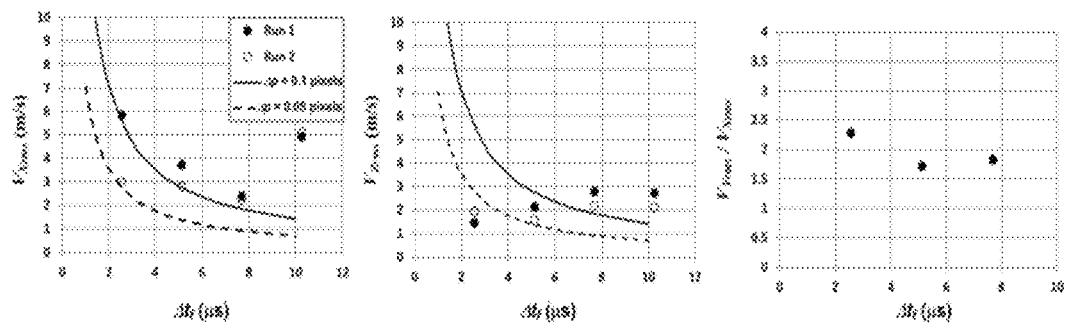
Figure 28:
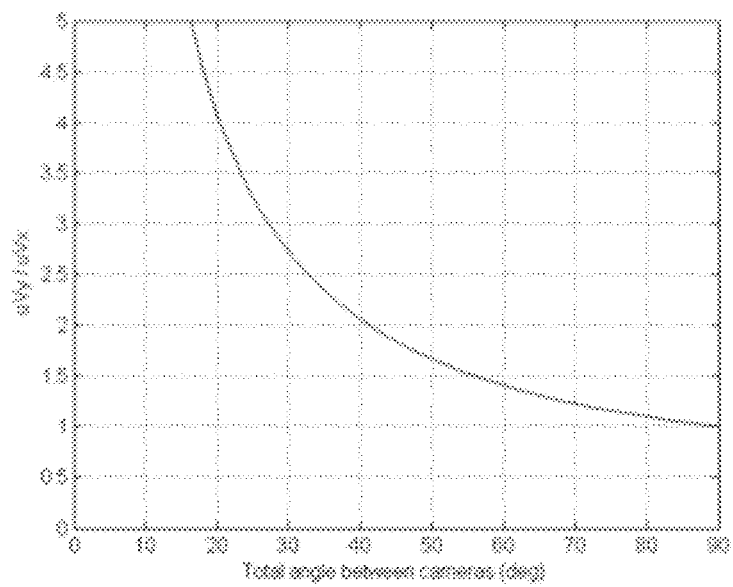
Figure 29A:
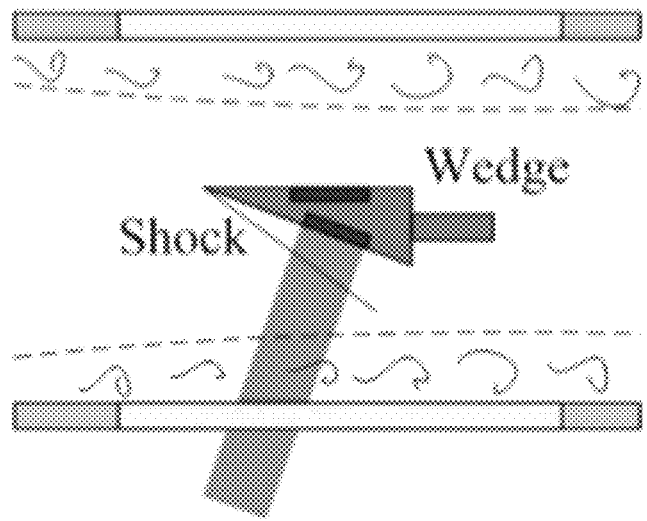
Figure 29B:
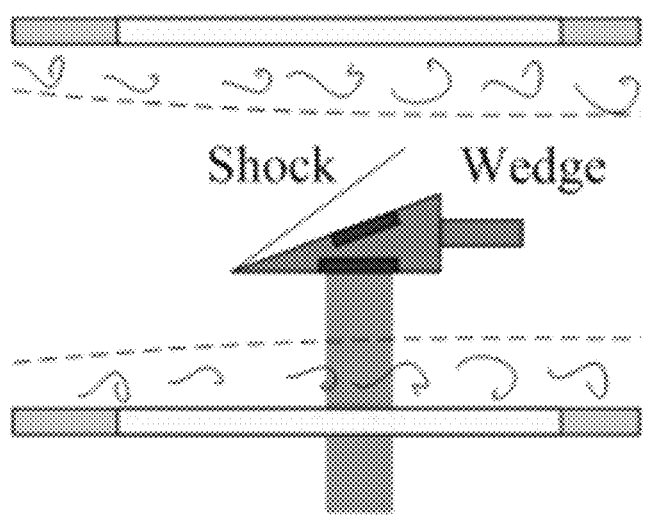
Figure 30:
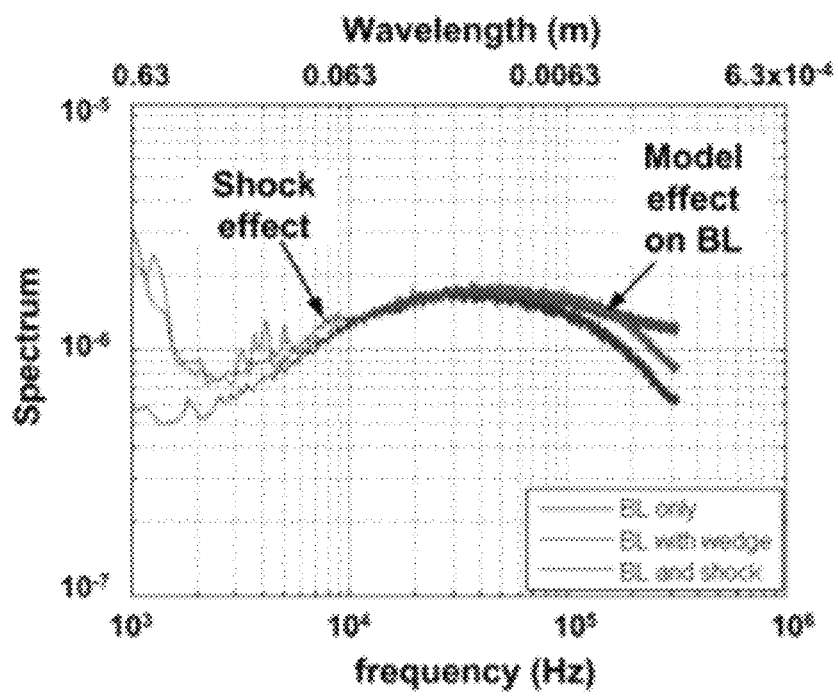
Figure 31:
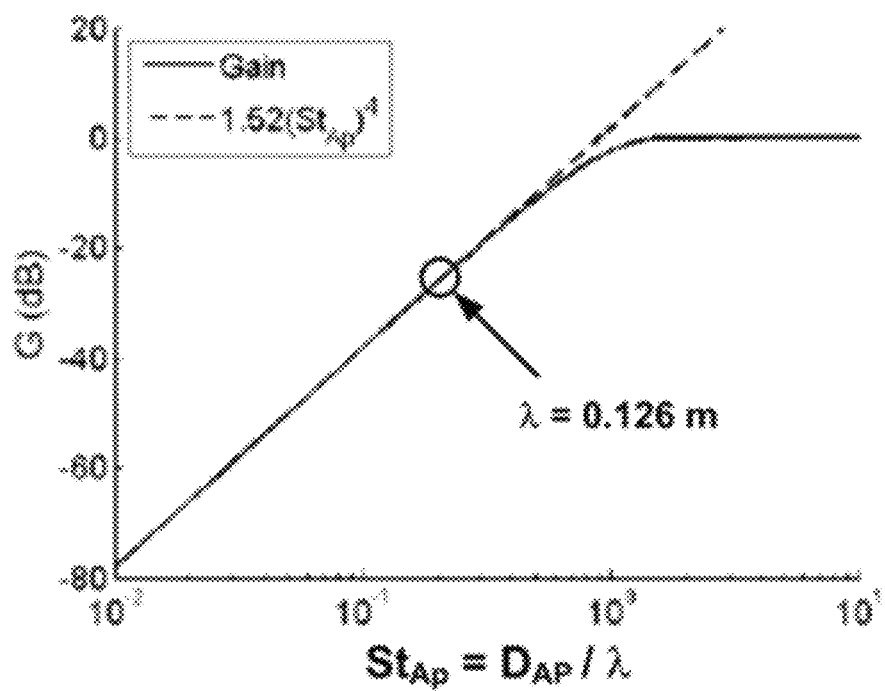
Figure 32:
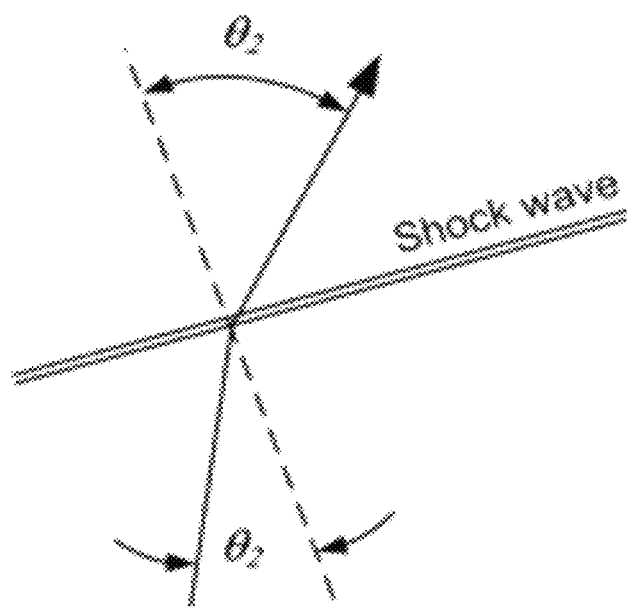
Figure 33:
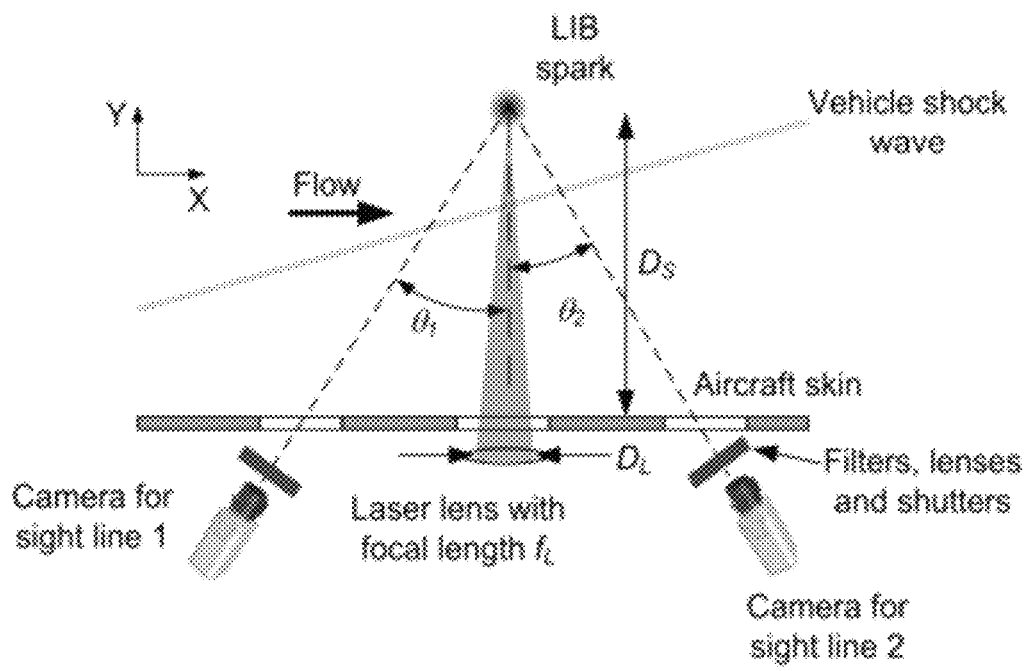
Figure 34:
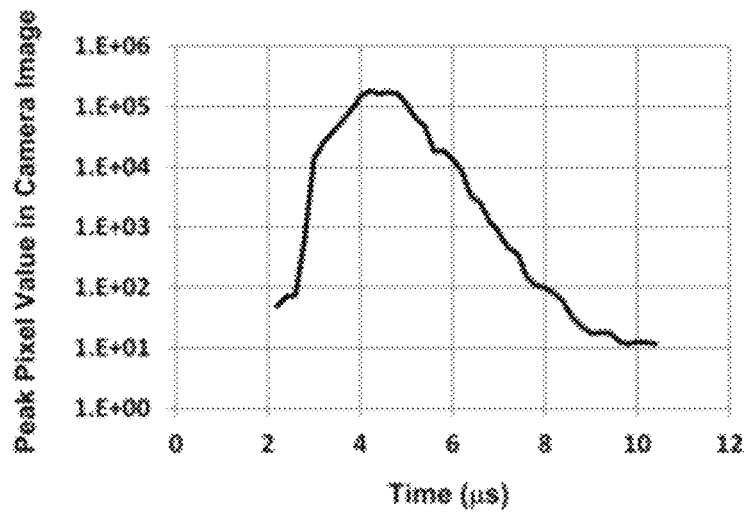
Figure 35:
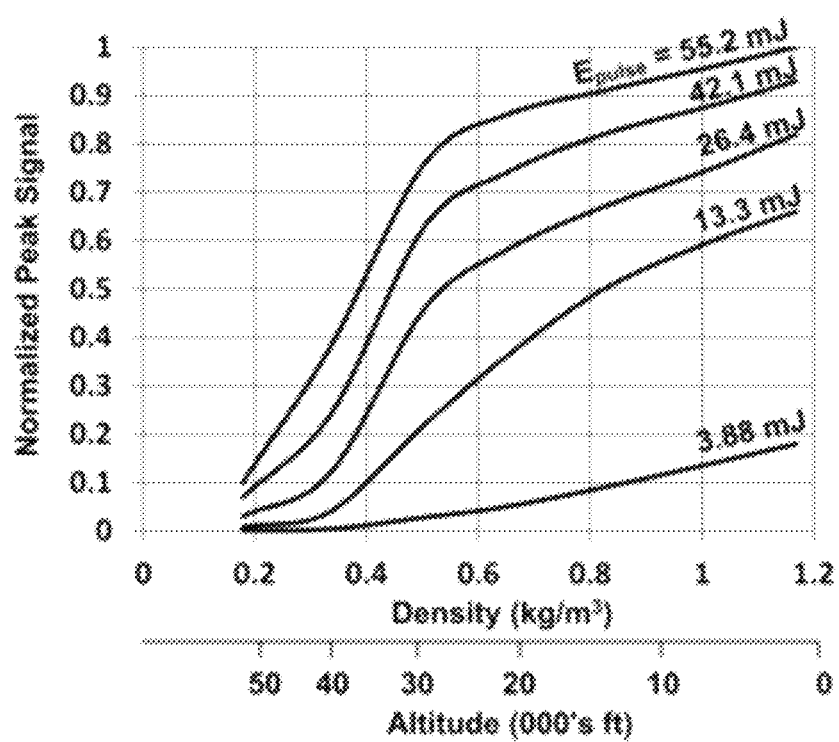
Figure 36:
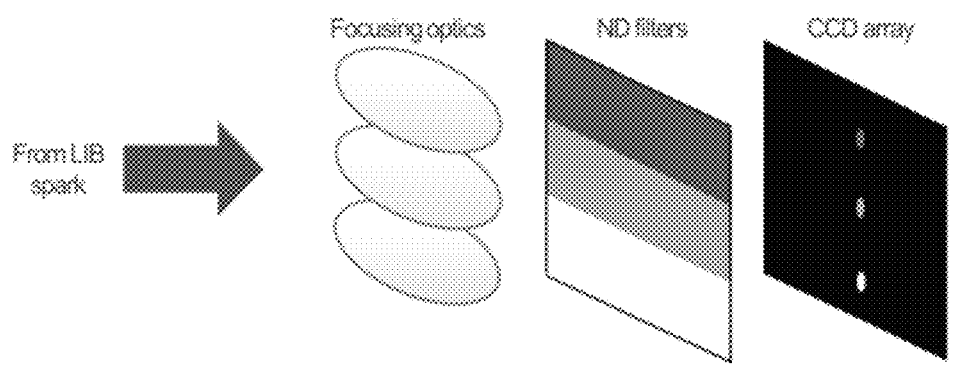
Figure 37:
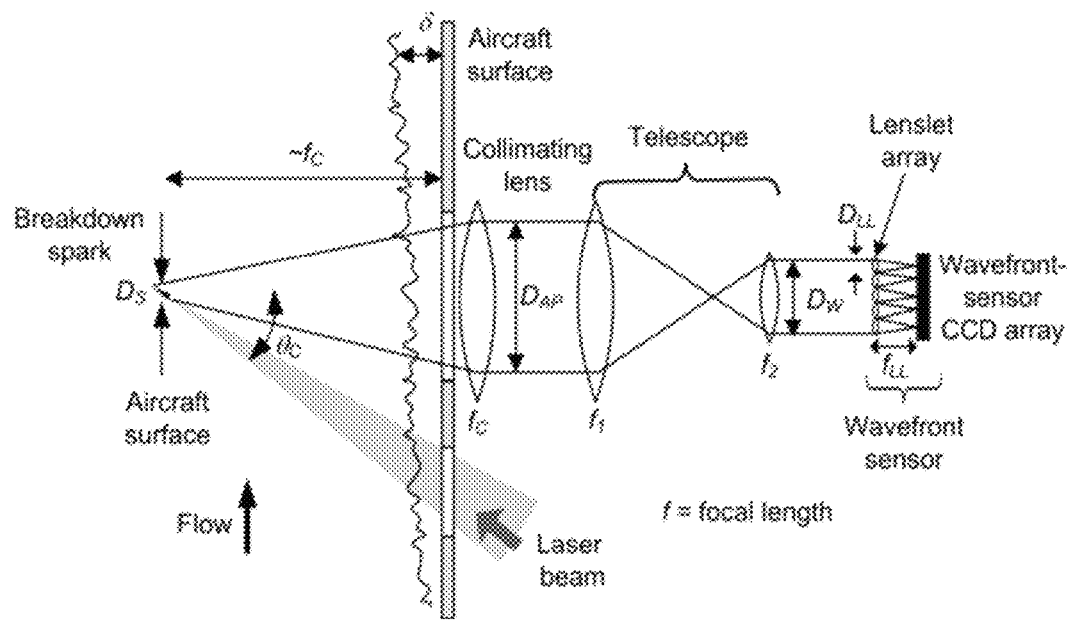
Figure 38:
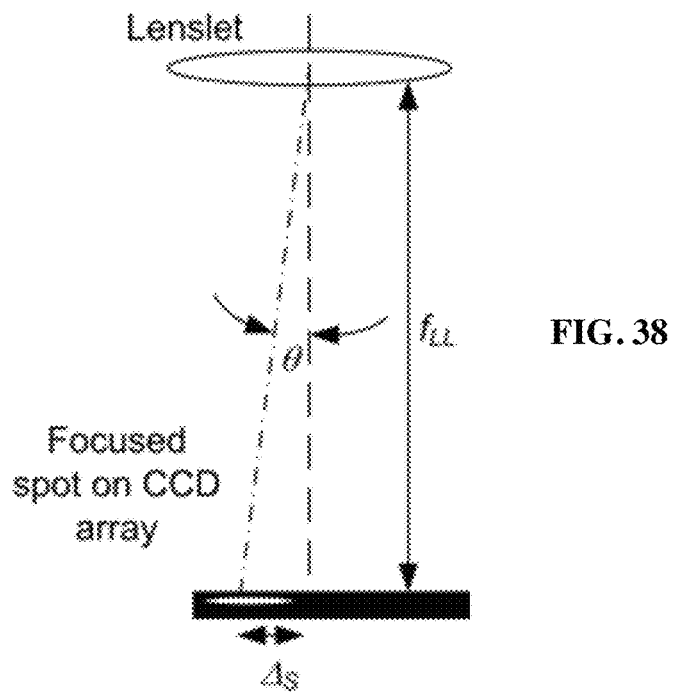
Figure 39:
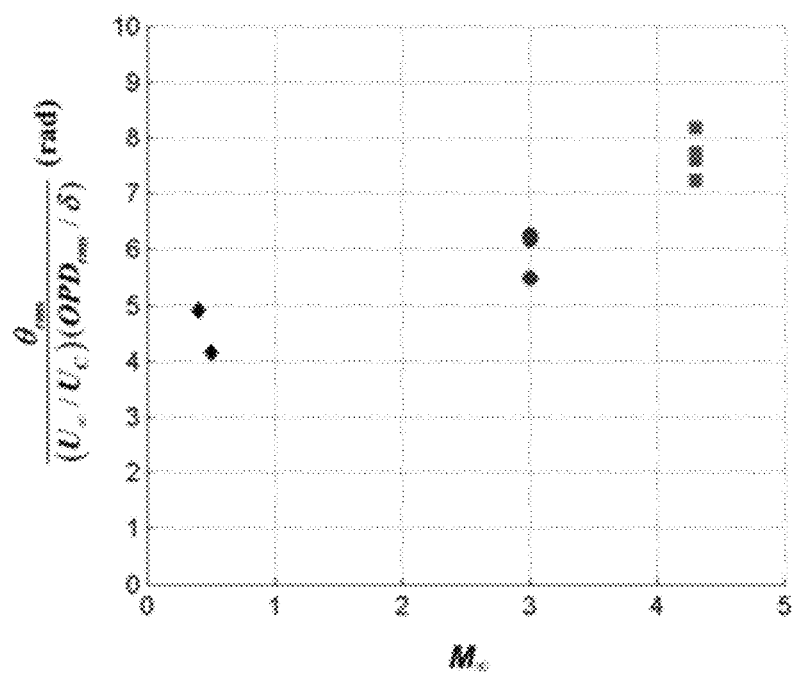

Aperture diameter is 100 mm. Time separation between wavefronts is 20 µs in accordance with a preferred exemplary embodiment of the present invention;

FIG. 3A is a schematic representation of a jitter spectrum calculation along the centerline of wavefronts; two-step matching of the resulting spectrum to a canonical spectrum (right) in accordance with a preferred exemplary embodiment of the present invention;

FIG. 3B is a schematic representation of a two-step matching of the resulting spectrum to a canonical spectrum using the data from FIG. 3A in accordance with a preferred exemplary embodiment of the present invention;

FIG. 4 is a table highlight experimental results for the derivation of an empirical function in accordance with a preferred exemplary embodiment of the present invention;

FIG. 5 is a schematic representation of an air-data probe in accordance with a preferred embodiment of the present invention in accordance with a preferred exemplary embodiment of the present invention;

FIG. 6A is a chart illustrating flow static pressure altitude in accordance with a preferred exemplary embodiment of the present invention;

FIG. 6B is a chart illustrating maximum altitude in accordance with a preferred exemplary embodiment of the present invention;

FIG. 7A and FIG. 7B are schematic representations illustrating the spatial $OPD_{RMS}$ of wavefronts before and after removal of one or more Zernike modes in accordance with a preferred exemplary embodiment of the present invention;

FIG. 8 is a schematic representation of an experiment to measure wall boundary layers using return light from an LIB spark in accordance with a preferred exemplary embodiment of the present invention;

FIG. 9A a typical unprocessed dot pattern from wavefront sensor, with applied aperture shown in red in accordance with a preferred exemplary embodiment of the present invention;

FIG. 9B is a schematic representation of a sample wavefront computed from the apertured dot pattern of FIG. 9A in accordance with a preferred exemplary embodiment of the present invention;

FIG. 10 is a schematic diagram showing how small displacements ε of the LIB spark towards or away from the collimating lens produce residual defocus on the measured wavefront in accordance with a preferred exemplary embodiment of the present invention;

FIG. 11 is a graph illustrating the Zernike coefficients for a typical dataset in accordance with a preferred exemplary embodiment of the present invention;

FIG. 12 is a schematic representation 9 wavefronts with certain Zernike modes removed in accordance with a preferred exemplary embodiment of the present invention;

FIG. 13 is a schematic representation of spatial $OPD_{RMS}$ of wavefronts before and after removal of certain Zernike modes in accordance with a preferred exemplary embodiment of the present invention;

FIG. 14 is a schematic representation depicting the dependence of spatial $OPD_{RMS}$ on air density in accordance with a preferred exemplary embodiment of the present invention;

FIG. 15A is a schematic representation depicting an ensemble-averaged spectrum;

FIG. 15B is a schematic representation depicting equivalent beam jitter along centerline of wavefronts in accordance with a preferred exemplary embodiment of the present invention;

FIG. 16 is a schematic representation depicting the matching of data acquired using LIB spark at to (points) to canonical spectrum for boundary layer in accordance with a preferred exemplary embodiment of the present invention;

FIG. 17 is a schematic representation depicting the matching of data acquired using LIB spark at to (points) to canonical spectrum for boundary layer in accordance with a preferred exemplary embodiment of the present invention;

FIG. 18 is a schematic representation depicting a single image of a small number of dot images captured at high rate (650 kHz) using a charge coupled device ("CCD") camera and used to determine the boundary-layer canonical spectrum in accordance with a preferred exemplary embodiment of the present invention;

FIG. 19 is a schematic representation of the experimental setup used to measure the boundary-layer canonical spectrum in accordance with a preferred exemplary embodiment of the present invention;

FIG. 20 is a schematic representation of the canonical deflection-angle spectra for $M_\infty=3$ and 4.38, compared with a subsonic spectrum in accordance with a preferred exemplary embodiment of the present invention;

FIG. 21 is a schematic representation of the experimentally-measured normalized convective speeds of aero-optical structures in accordance with a preferred exemplary embodiment of the present invention;

FIG. 22 is a schematic representation of the modified empirical function $F(M_\infty)$ obtained from CW wavefront measurements in accordance with a preferred exemplary embodiment of the present invention;

FIGS. 23 and 23A and 23B are schematic representations of a test configuration and the comparison of velocity components determined from spark motion with calibrated windspeed in accordance with a preferred exemplary embodiment of the present invention;

FIGS. 24A and 24B are schematic representations of the standard deviation of velocity components measured using an LIB spark in accordance with a preferred exemplary embodiment of the present invention;

FIG. 25 is a schematic diagram of the optical setup for the measurements in accordance with a preferred exemplary embodiment of the present invention;

FIG. 26 is a series of sequence camera frames acquired using a high-speed camera in accordance with a preferred exemplary embodiment of the present invention;

FIG. 27 is a schematic representations for rms of velocity data as a function of frame time separation in accordance with a preferred exemplary embodiment of the present invention;

FIG. 28 is a schematic representations of uncertainties of $V_y$, $V_z$ as a function of total angle between cameras in accordance with a preferred exemplary embodiment of the present invention;

FIGS. 29A and 29B are schematic representations depicting reflection of collimated CW laser from mirror mounted in 20° wedge in accordance with a preferred exemplary embodiment of the present invention;

FIG. 30 is a schematic representation depicting reflection of collimated CW laser from mirror mounted in 20° wedge;

FIG. 31 is a schematic representation depicting the effect of a circular aperture with diameter $D_{AP}$ on aero-optical disturbances with wavelength λ in accordance with a preferred exemplary embodiment of the present invention;

FIG. 32 is a schematic representation depicting refraction of light by vehicle shock wave in accordance with a preferred exemplary embodiment of the present invention;

FIG. 33 is a schematic representation depicting a basic layout for an air-data probe in accordance with a preferred embodiment of the present invention;

FIG. 34 is a schematic representation depicting typical camera peak pixel value over the spark lifetime in accordance with a preferred exemplary embodiment of the present invention;

FIG. 35 is a schematic representation depicting normalized peak spark brightness variation with air density in accordance with a preferred exemplary embodiment of the present invention;

FIG. 36 is a schematic representation depicting one approach to increase dynamic range of individual camera in accordance with a preferred exemplary embodiment of the present invention;

FIG. 37 is a schematic representation depicting a wavefront sensor showing important design variables in accordance with a preferred exemplary embodiment of the present invention;

FIG. 38 is a schematic representation depicting the effect of $f_{LL}$ on wavefront-sensor sensitivity in accordance with a preferred exemplary embodiment of the present invention; and FIG. 39 is a schematic representation depicting the effect of root-mean-square wavefront slope $\theta_{rms}$ versus $OPD_{RMS}$ for boundary-layer data in accordance with a preferred exemplary embodiment of the present invention.

DETAILED DESCRIPTION OF INVENTION

An apparatus and method for measuring boundary layer parameters including velocity and associated flow angles by optical tracking of the light emitted by a LIB spark is disclosed. In the most preferred embodiments of the present invention, a novel "air-data probe" or aero-optic instrument is described in which three components of freestream velocity are measured by tracking the motion of a LIB spark that is created in the freestream flow outside of the vehicle shock.

Measurements performed in a blowdown wind tunnel at a nominal flow Mach number of 4.38 demonstrate that flow velocity could be accurately measured using one or more of the preferred embodiments of the present invention, with a demonstrated flow-angle uncertainty of less than ±0.2° for a Mach 4.38 test condition. Wavefront measurements taken through the shock of a 20° wedge demonstrate that measurements of velocity and associated flow angles could also be performed through a shock with negligible effect on spark formation due to the much smaller aperture of the LIB laser beam in relation to the wavelength of the shock aero-optical effect.

Two important concepts used in the most preferred embodiments of the present invention are, first, the employment of a optical/thermal-tufting technique for real-time determination of three-dimensional velocity components, and second, the use of innovative aero-optic techniques for determining spatially-resolved fluctuating flow properties. The thermal-tufting techniques of the present invention are designed to be packaged and implemented in the form of an air-data probe or aero-optic instrument that would provide measurements of 3-components of velocity, angle of attack, sideslip angle, and Mach number, and which would most likely be placed near the vehicle nose where the shock is expected to be relatively steady owing to laminar flow in the initial leading-edge boundary layer. The aero-optic instrument comprises a wavefront sensor and other optical components that will generally be situated further downstream on the test vehicle, and configured to determine flow transition and turbulence in the vehicle boundary layer.

Figure 1:
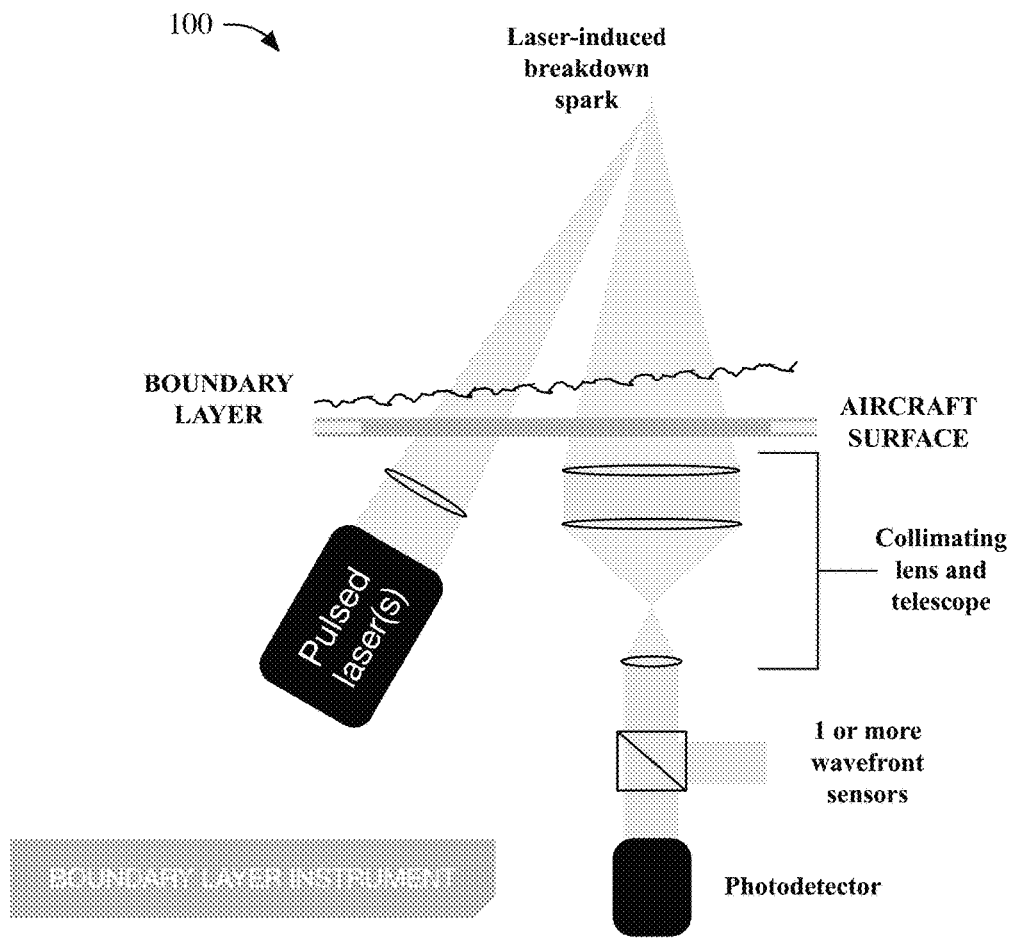
FIG. 1 is a schematic representation of an air data probe used to measure 3-components of freestream velocity in a hypersonic test environment in accordance with a preferred exemplary embodiment of the present invention.

Referring now to FIG. 1, a schematic diagram of an aero-optical instrument 100 used to measure 3-components of freestream velocity in a hypersonic test environment in accordance with a preferred exemplary embodiment of the present invention is depicted. In the most preferred embodiments of the present invention, aero-optical instrument 100 comprises: one or more pulsed laser(s) with output focused to generate a LIB spark; optical components sufficient to collect the light from the LIB spark after it passes through the aircraft boundary layer, and condition and transmit that light into wavefront sensors and a photodetector; one or more wavefront sensors to measure wavefronts through the aircraft boundary layer; and a photodetector to measure the LIB spark brightness. Aero-optical instrument 100 will measure the freestream flow conditions on the other side of the vehicle shock wave, so that the LIB spark used for aero-optical instrument 100 and possibly also for the aero-optical instrument will be generated through the shock wave.

Figure 2:
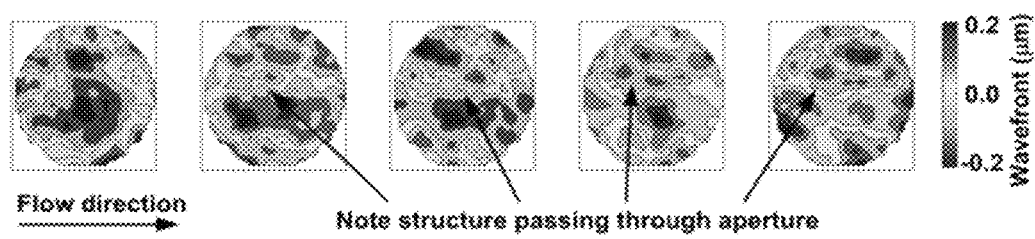
FIG. 2 is a schematic representation of a time lapse display of a time series of boundary-layer wavefronts measured using a high-speed wavefront sensor at $M_\infty=0.6$.

Referring now to FIG. 2, an example of an aero-optical measurement of wavefronts through a turbulent compressible boundary layer is depicted. As shown in FIG. 2, the wavefronts show the integrated effect of density variations in the boundary layer along the path of the interrogating light beam. Specifically, turbulent flows contain density variations that are associated with temperature and/or pressure variations in the flow. Index of refraction variations are related to density variations through the Gladstone-Dale relationship:

$$n(x,y,z)=1+K_{GD}\rho(x,y,z) \qquad (1)$$

where $K_{GD} \sim 2.25 \times 10^{-4}$ kg/m³ for visible and near-IR wavelength radiation in air. The transmission of a beam of light through the compressible turbulent flow therefore contains information on the density field of the flow that can be used to determine flow properties. The term "aero-optics" describes the study of the optical effects of compressible flows.

FIG. 2 clearly shows the presence of optically-active structures within the boundary layer, and the passage of these structures through the measurement aperture.

Cross correlation of sequential wavefronts gives the convection speed of the dominant aero-optical structures in the boundary layer; these structures have been shown to convect at approximately 0.8 times the local freestream speed. Second, if a spectrum is computed along the wavefronts in the flow direction as shown in FIG. 3, then this spectrum has been found to have the same shape for all turbulent flat-plate boundary layers in equilibrium. Specifically, the spectrum has its peak at a Strouhal number based on boundary-layer thickness $\delta$ of 1, and the magnitude of the spectrum scales with the parameter $\rho_\infty \, \delta \, M_\infty^2 \, C_f F(M_\infty)$, where the function $F(M_\infty)$ is shown in FIG. 4. This means that boundary-layer thickness $\delta$, and parameter $\rho_\infty \, M_\infty^2 \, C_f$ for an unknown boundary layer can be determined by matching the spectrum of the unknown boundary layer to the canonical spectrum; an schematic showing this kind of "spectral matching" is shown in FIG. 3B.

For at least some preferred embodiments of the present invention, in addition to the aero-optical instrument, an air-data probe may also be used to measure freestream velocity $V_\infty$, pitch $\alpha$ and yaw $\beta$ on hypersonic flight-test vehicles.

Referring now to FIG. 5, a schematic diagram of an air-data probe in accordance with a preferred embodiment of the present invention is depicted. As shown in FIG. 5, a LIB spark is created in the freestream flow and the motion of the spark is tracked using multiple cameras. All three components of velocity are computed from a stereoscopic analysis of the images from both cameras. Those skilled in the art will recognize that while a CCD camera is commonly used in applications such as particle image velocimetry ("PIV") that track a large number of images at the same time, there are other optical instruments that are suitable that have lower size and power requirements. Since in many preferred embodiments of the present invention, only a single (spark) image will need to be tracked, detection of the spark location may be accomplished using alternative means. A potential candidate for such an application is a Position Sensing Device (PSD) with a focusing lens system. This optical device is small in size, relatively low-cost, low in power consumption, and fast responding. A lens will focus the spark image onto the PSD sensing surface, and the sensor output will provide the centroid position. Desired position resolution can be obtained by properly selecting the optical components.

A schematic of the basic instrument layout is shown in FIG. 5. The instrument comprises:

a. Pulsed laser with output focused to generate a LIB spark b. Cameras with various optical equipment to image the spark The apparent location of the spark from the camera images is then determined using centroiding calculations after which three components of velocity are determined from a stereoscopic analysis of the spark locations in the two camera images.

Calculations based on published data also show that it should be possible to use the LIB spark at reasonably-high altitudes during hypersonic flight tests. Specifically, an LIB spark is created when the irradiance at the focal point of a focused laser beam exceeds the breakdown threshold for air. As the atmospheric pressure decreases with altitude, the breakdown threshold for LIB increases due to the reduced molecular density in the focal region of the laser beam. In a previous experiment, the breakdown threshold for a 1 mm wavelength laser beam was measured to be:

$$I_{th}=2.9\times10^{15}P_\infty^{-0.733} \text{ (W/cm}^2\text{)} \quad (2)$$

where $P_\infty$ is the static pressure in Pa. For a beam with pulse energy E and pulse duration $\Delta t$, focused by a lens (or mirror) with focal length $f_L$ and aperture $D_L$, the average irradiance I at the focal point of the focusing lens is:

$$I = \frac{E}{4\pi\Delta t \left[\frac{\lambda f_L}{\pi D_L}\right]^2} \quad (3)$$

Breakdown and formation of the LIB spark occurs when $I=I_{th}$. Based on data from commercial laser vendors, typical laser parameters for the application would be a Nd:YAG laser with maximum pulse energy E~300 mJ, $\lambda$=1.06 mm, and $\Delta t$~5 ns.

Referring now to FIG. 6A and FIG. 6B, the minimum flow static pressure (FIG. 6A) and maximum altitude (FIG. 6B) computed using Eqs. (3) and (4) for formation of a LIB spark with sufficient brightness for good optical measurements, where YAG laser parameters are E~300 mJ, $\lambda$=1.06 µm, and $\Delta t$~5 ns.

The plot in FIG. 6A shows the minimum air pressure at which breakdown will occur using a laser with these parameters, while the right plot shows the corresponding maximum altitude assuming standard-atmosphere conditions. The data in FIG. 6A and FIG. 6B are shown for the range of $f_L/D_L$ for the laser-focusing optics and were also computed assuming that 50 mJ of the laser pulse energy would be left over after achieving breakdown to generate a LIB spark bright enough for a good signal. FIG. 6A and FIG. 6B shows that it should be possible to generate the LIB spark up to an altitude of at least 20 km for all possible $f_L/D_L$ and even up to 40 km with careful selection of the laser optics.

The measurement effectiveness of the boundary-layer aero-optical instrument also has an altitude dependence. The optical signal produced by a turbulent boundary layer is given by:

$$OPD_{RMS}=K_{GD}\rho_\infty M_\infty^2 \delta\sqrt{C_f}F(M_\infty) \quad (4)$$

where $OPD_{RMS}$ is the root-mean-square of the spatial variations in optical path difference (OPD) produced by the boundary layer (OPD is the conjugate of the wavefront emerging from the flow). At current technology levels, the minimum $OPD_{RMS}$ for wavefront measurements with good signal-to-noise characteristics is generally considered to be in the range of $OPD_{RMS}\sim2\times10^{-2}$ µm. The minimum freestream density that would generate this signal level, computed using Eq. (2) is shown in FIG. 7, which includes corresponding altitudes computed assuming standard-atmospheric conditions. Note that ground-test and CFD studies have shown that the boundary layer on the Hypersonic International Flight Research Experimentation (HIFiRE-5) test platform is turbulent at the downstream region of the payload section at all test conditions without the need for boundary-layer trip devices and in the range $\delta\sim2$ mm to 10 mm. As such, FIG. 3 shows that the boundary layer on hypersonic vehicles should produce measurable aero-optic signals up to altitudes in the range of 10 km to 20 km. It should also be noted that other aero-optic flows such as shear layers, shocks and vortex flows produce optical aberrations that are significantly stronger than boundary-layer flows and hence could be measured at higher altitudes.

The most preferred embodiments of the present invention comprise an air-data probe and aero-optical instrument for measurement of boundary-layer parameters, for use in hypersonic flight vehicles. Collectively, these two instruments are used to measure the following parameters:

Three components of freestream velocity and flow angles: Freestream flow components are determined by optical/thermal tracking of a LIB spark.

Local flow density $\rho_\infty$: Flow density is determined from the brightness of the LIB spark.

Boundary-layer thickness $\delta$: As shown in FIG. 3B and FIG. 3B, the boundary-layer thickness for an unknown boundary layer can be determined by scaling the measured wavefront spectrum of the boundary layer until the peak of the spectrum occurs at $St_\delta=1$.

Local flow Mach number $M_\infty$: As shown in FIG. 3B, the parameter $\rho_\infty \delta M_\infty^2 C_f F(M_\infty)$ for an unknown boundary layer can be determined by scaling the magnitude of the wavefront spectrum of the boundary layer until it matches the canonical spectrum. Since $F(M_\infty)$ is a known function (FIG. 4), $C_f$ and is a weak function of Reynolds number, an estimate for local $M_\infty$ can be obtained using results for $\rho_\infty$ and $\delta$.

Experiment 1

Testing of aero-optical instrument 100 was performed in a wind tunnel with a blowdown configuration comprising: test-section dimensions of 1 ft.×1 ft.; maximum Mach number of 4.38; and maximum test-section total pressure of 1.7 MPa. The air storage consists of six 25.5 m³ tanks that can be pumped to a pressure of 4 MPa, giving up to 7 min of total run time depending on test conditions. The stored air is first dried to −45° C. dew point and then heated to around 38° C. in order to prevent water condensation, ice formation and/or liquefaction in the test section.

The measurements were performed at test-section Mach numbers of 3 and 4.38. Tunnel conditions for all tests performed are summarized below in Table 1. The boundary-layer thickness δ is dictated primarily by the length of the nozzle block for the test Mach number and was verified by Schlieren and theoretical calculations. The standard-atmosphere altitude shown in Table 1 is based on the test-section density, which has the most effect on the magnitude of the aero-optic aberration produced by the boundary layer and hence signal strength of the measurements.

TABLE 1

| Parameter | Test 1 | Test 2 | Test 3 | Test 4 | Test 5 |
|---|---|---|---|---|---|
| Mach number | 4.38 | 3.0 | 3.0 | 3.0 | 3.0 |
| Total pressure (MPa) | 1.5 | 1.4 | 1.0 | 0.7 | 0.5 |
| Density (kg/m$^3$) | 0.36 | 1.13 | 0.86 | 0.57 | 0.42 |
| δ (mm) | 25 | 15 | 15 | 15 | 15 |
| Effective altitude (km) | 12.2 | 0.8 | 3.5 | 7.3 | 9.7 |

Referring now to FIG. 8, a schematic diagram showing the integration of the optical setup in a wind tunnel test section in accordance with a preferred embodiment of the present invention is depicted. The experiments were performed with an empty test section. A LIB spark was formed near the far wall of the test section by focusing a Nd:YAG pulsed laser with wavelength of 355 nm through a fused-silica window with good UV transmission properties. The advantage of the 355 nm wavelength is that, since the focal region of the focused laser beam becomes smaller as the wavelength is reduced, breakdown can be achieved with less pulse energy so that smaller LIB sparks can be formed which can improve the performance of the wavefront measurements.

The LIB spark was formed using a 500 mm focal length lens with a 50 mm aperture, giving an f-number of the focusing lens of 10. Using these optics, an LIB spark could be formed in the $M_\infty$=4.38 flow with sufficient brightness for wavefront measurements using approximately 20 mJ pulses. Measurements were also made with a long pass filter with 550 nm cutoff wavelength in the optical setup to reduce the effect of reflections. Using this filter, pulse energies up to approximately 38 mJ were required; however, it was later found that the filter gave very little improvement to the wavefront calculations since the effects of the reflections could also be removed when processing the images.

Wavefront data were acquired using a lenslet array with 38.1 mm focal length and 0.3 mm lenslet pitch attached to a high-speed camera. The beam size on the CCD sensor was typically sized to span around 50 lenslets, with pixel resolution of ~15 pixels per lenslet. The wavefront acquisition rate was 10 Hz, which was dictated by the maximum pulse rate of the LIB laser.

In general, the brightness of the LIB spark was not found to be a problem, with good wavefront measurements achieved using very small laser pulse energies on the order of 10 mJ/pulse. Wavefront data were acquired using a lenslet array with 38.1 mm focal length and 0.3 mm lenslet pitch attached to a high-speed camera. The beam size on the CCD sensor was typically sized to span around 50 lenslets, with pixel resolution of ~15 pixels per lenslet. The wavefront acquisition rate was 10 Hz, which was dictated largely by the maximum pulse rate of the LIB laser.

Referring now to FIG. 9A, an example of a single unprocessed image from the wavefront sensor. The grey regions at the top and bottom of the figure represent regions of the camera CCD array that were outside of the extent of the lenslet array. These regions were removed by applying a circular aperture to the dot pattern, as shown by the red circle.

Referring now to FIG. 9B, wavefronts were then computed from the apertured dot patterns using standard techniques. Specifically, an algorithm was used to identify the areas of interest (AOI) for each data set, where each AOI contains a dot (i.e. spark image) used in calculating wavefront slopes. Wavefront slopes for individual images were then computed based on dot deflections that referenced the respective centroids of each dot in the mean image, and wavefronts were reconstructed from the wavefront slopes. FIG. 9 shows a typical wavefront computed using this methodology.

Additionally, motion and/or small distortion of the LIB spark from ignition to ignition produce wavefront distortions of the spark-emitted light that are well characterized by Zernike polynomials. As an example, FIG. 10 illustrates how small displacements e of the spark towards or away from the focal point of the collimating lens result in a distortion of the spark emitted light that appears as defocus (Zernike mode 4); note that the sample wavefront shown in FIG. 9B clearly shows a significant defocus component. The first 55 Zernike coefficients for a typical wavefront set are plotted in FIG. 11, which shows that the wavefronts are contaminated in this way primarily by defocus (Zernike mode 4), coma (mode 7), and some astigmatism (mode 6).

In general, wavefront distortions due to compressible boundary layers are poorly represented by Zernike polynomials, so that the effect of LIB spark motion can be removed by simply subtracting the affected Zernike modes from the measured wavefronts. FIG. 12 shows a sample of 9 wavefronts with Zernike modes 4, 6, and 7 removed, while FIG. 13 summarizes the effect of the removal on the spatial $OPD_{RMS}$ for a set of 60 wavefronts. As shown in Table 1, tests 2 to 5 were performed at $M_\infty$=3, but at different total pressures and hence static densities; FIG. 12 shows that the $OPD_{RMS}$ of the wavefronts measured using the spark depends linearly with density, as expected from Equation (4). This is an important result that shows that it is possible to make accurate measurements of boundary-layer optical distortions using the LIB spark, and that these measurements can be made at least up to the maximum altitude shown in Table 1, where the local air density and hence strength of the optical signal is significantly reduced.

Referring now to FIG. 15A and FIG. 15B, the mean jitter spectrum associated with the wavefront data acquired at $M_\infty$=3, $P_t$=1.4 MPa is depicted. The jitter data used to compute the spectrum were calculated as the slope of the OPD data extracted along the centerline of the wavefronts in the streamwise direction, as depicted in FIG. 15, right. The spectrum shown in FIG. 9 clearly shows a peak at $St_\delta$=1, as described above and shown schematically in FIG. 3; as such, this result demonstrates the ability to estimate the boundary-layer layer thickness δ of an unknown flow by selecting δ to align the peak of the spectrum with $St_\delta$=1.

Demonstration of the full spectral matching approach for the $M_\infty$=4.38 data is shown in FIG. 16 and in FIG. 17 for the $M_\infty$=3 data. FIG. 16 shows that the data acquired using the LIB spark at $M_\infty$=4.38 (points) very closely match the canonical curve for the boundary layer spectrum (solid line). This result demonstrates the accuracy of the spectral matching of the LIB data even after removal of the effect of the spark motion. To better illustrate the matching process, FIG. 17 shows matching in which the same freestream density of $\rho_\infty=1.13$ kg/m$^3$ was used to scale all of the spectra at $M_\infty=3$ data. As such, only the data for $P_t=1.4$ MPa are precisely matched to the canonical spectrum since the freestream density at $P_t=1.4$ MPa was actually 1.13 kg/m$^3$, while the data for the 3 other $P_t$ conditions lie beneath the canonical curve because the actual freestream density for these test cases was less than 1.13 kg/m$^3$; this result better illustrates how correct spectral matching only results when the correct test conditions are used.

The canonical spectrum shown in FIG. 16 and FIG. 17 was measured at the $M_\infty=3$ and 4.38 test conditions using a different optical setup that employed a continuous (CW) laser beam. This was done in order to better resolve the canonical spectrum over its full frequency range. Specifically, using a CW beam, it was possible to sample a few dots from the CCD array at much higher sampling rate of approximately 650 kHz, as shown in FIG. 18. This means that the CW measurement approach can resolve high frequency components that is limited only by the low-pass filtering effect of the size of the dots on the wavefront-sensor CCD array. Furthermore, the CW measurement approach is not affected by aperture effects that act as a high-pass filter at low frequencies (the effect of measurement aperture on the instrument design is discussed in detail below). As such, CW measurements of the boundary-layer spectrum can resolve a larger frequency bandwidth than measurements using the LIB spark.

Referring now to FIG. 18, a single image of a small number of dot images captured at high rate (650 kHz) using the CCD camera and used to determine the boundary-layer canonical spectrum is depicted. As previously explained, other optical sensing devices such as a PSD optical device may take the place of the CCD camera in various preferred embodiments as adapted for specific application environments.

Referring now to FIG. 19, a schematic representation of the experimental setup used to measure the boundary-layer canonical spectrum is depicted. As shown in FIG. 19, a collimated laser beam was passed through the TWT test section such that the beam picked up the aberrating effect of the boundary layers on both of the test-section walls. The return mirror on the other side of the test section then reflected the beam back to the optical table exactly the same way as it was projected into the test section, thereby doubling the measured aero-optical effect and hence improving the signal strength of the measurements. The beam was then passed through a beam reducer and into a high-speed Shack-Hartmann WaveFront Sensor, WFS. The camera used in the wavefront sensor had a 38 mm focal length, 70×60 lenslet array.

The convective speed of the aero-optical structures and the corresponding traveling portion of the deflection angle spectrum, $q_T(f)$, was calculated using a multi-point cross-correlation technique. Using the frozen field assumption, various important characteristics of the BL-related aero-optical distortions, such as an overall level of aero-optical distortions, $OPD_{RMS}$, and the aperture function, $G(Ap)$, was calculated as follows:

$$OPD_{rms}^2 = 2U_c \int_0^\infty \frac{|\hat{\theta}_T(f)|^2}{(2\pi f)^2} df \quad (5)$$

-continued $$G(Ap/\delta) \equiv OPD_{rms}(Ap)/OPD_{rms}, \text{ where} \quad (6)$$

$$OPD_{rms}^2(Ap) = 2U_c \int_0^\infty AF(Ap, f) \frac{|\hat{\theta}(f)|^2}{(2\pi f)^2} df$$

Referring now to FIG. 20, the resulting normalized deflection-angle amplitude spectra for $M_\infty=3$ and 4.38 cases are depicted. The subsonic deflection angle spectrum is also shown for comparison. All spectra have a peak at approximately $St_\delta=1$. At the low end of the spectrum, $0.05<St_\delta<1$, which corresponds to large-scale structures, the deflection angle amplitude decreases as the Mach number increases. At the high-end of the spectra, $St_\delta>1$ the trend is the opposite: energy in the small-scale structures increases with increasing Mach number.

Referring now to FIG. 21, convection speeds $U_C$ for the aero-optical structures in the boundary layer were also computed from the CW results. As shown in FIG. 21, the results obtained in the TWT show that $U_C$ increases slightly with $M_\infty$. Finally, the CW results were used to update the empirical function $F(M_\infty)$ shown in FIG. 4 The updated fit for $F(M_\infty)$ is plotted as the "modified ND model" shown in FIG. 22, and reflects corrections primarily for the updated convection speed results shown in FIG. 21 as well as other minor corrections.

In summary, the spectra in FIG. 20, convective speeds in FIG. 21, and modified $F(M_\infty)$ in FIG. 20, are new results for high-speed boundary-layer flows and show that the boundary-layer aero-optical behavior changes slightly with freestream Mach number. The canonical spectra shown in FIG. 20 were used for the spectral matching approach shown in FIG. 16 and FIG. 17.

Testing of the air-data probe concept was performed in the subsonic indraft wind tunnels and also in a Trisonic Wind Tunnel. For the subsonic indraft tests, only a single sight line to the camera was recorded so that only two components of velocity of the LIB spark were measured. Full stereoscopic measurements of the spark motion were performed in the tests described below. A schematic of the subsonic test configuration is shown in FIG. 23.

The LIB spark was formed by focusing a frequency-tripled Nd:YAG pulsed laser with wavelength of 355 nm through a UV-transmitting fused-silica window into the center of the wind-tunnel test section. The motion of the spark in a variety of flow conditions was measured using a Photron SA1.1 high-speed camera a frame rates of 300 kHz (128×64 pixels) or 500 kHz (64×32 pixels). A telephoto lens was used as required to increase the resolution of the spark images, and measurements were made at different shutter speeds. The pulse energy E of the LIB laser was also varied during the tests, as well as the speed of the flow, and the focal length $f_L$ of the lens used to focus the LIB laser.

Images acquired using the high-speed camera were analyzed to determine the centroid of the spark, and the two components of velocity in the image plane of the camera were computed by dividing the change in spark centroid position between successive images by the time separation between images. Since the camera was aligned perpendicular to the tunnel flow direction, the resulting velocity components were equal to the tunnel flow velocity and cross-stream (pitch) velocity.

Referring now to FIG. 23, a comparison of the velocity components determined from the motion of the LIB spark to the calibrated wind speed for the wind tunnel is depicted. As shown in FIG. 23, the $V_X$ results are generally within the uncertainty range of the calibrated wind speed for the wind tunnel. However, FIG. 23 shows that the $V_Y$ flow speed measured using the LIB spark for $f_L/D_L=15$ was outside the uncertainty band of the calibrated wind speed. This result was most likely due to misalignment of the image plane of the camera with the wind-tunnel flow direction for the tests; as such, the result illustrates that some kind of in-situ calibration of the velocities detected by the instrument should be devised and performed after setup of the camera.

Alternatively, the large rms of the wind-speed results obtained for $f_L/D_L=15$, as shown in FIGS. 24A and 24B, suggests that an error in the optical setup such as poor focusing or resolution of the LIB spark, or vibration of the optical table may also have occurred. Note that vibration effects would be reduced or eliminated in an instrument hardened for deployment. For the subsonic tests reported in the midterm report, an uncertainty in the measured wind speed of ±6 m/s was also reported (95% confidence); however, as shown below, a 33% lower uncertainty was obtained for the TWT tests possibly due to better image resolution or due to the fact that a better optical table with vibration isolation was used for the TWT tests. In summary, however, the subsonic wind speed tests performed in the indraft wind tunnel demonstrate that the air-data probe instrument concept can be successfully used to measure low-speed subsonic flows.

Testing of the air-data probe was also conducted in the previously described tests. All tests were performed at a Mach number of 4.38 and test-section total pressure of 1.5 MPa. The test-section windspeed at these test conditions, computed assuming isentropic expansion from the stagnation conditions in the wind-tunnel settling chamber, was approximately 700 m/s. The test-section density was 0.31 kg/m³, which corresponds to a standard-atmosphere altitude of 12000 m; note that the local air density has the most effect on the brightness of the LIB spark and hence signal strength of the instrument.

Referring now to FIG. 25, a schematic diagram of the optical setup to measure three components of motion of LIB spark is depicted. The experiments were performed with an empty test section. A LIB spark was formed near the center of the test section by focusing a Nd:YAG pulsed laser with wavelength of either 355 nm or 1064 nm through a fused-silica window with broad transmission bandwidth into the center of the wind-tunnel test section. The advantage of the 355 nm wavelength is that, since the focal region of the focused laser beam becomes smaller as the wavelength is reduced, breakdown can be achieved with less pulse energy so that smaller LIB sparks can be formed which can improve the spatial resolution of the measurements. On the other hand, the laser can output substantially more pulse energy at its fundamental wavelength of 1064 nm, due to losses in the harmonic generators used to frequency-triple the laser output to 355 nm.

As shown in FIG. 25, a plate beamsplitter was used to merge two sight lines of the LIB spark onto the camera images to enable stereoscopic measurement of the three components of motion of the spark. Note that in a deployed instrument, the stereoscopic measurements would be made using multiple sensors (see FIG. 5); however, the optical setup of FIG. 25, was used to enable the measurements using a single high-speed camera. Lenses with 500 mm focal length were used to accomplish simultaneous focusing of both sight paths onto the camera images, while at the same time providing an optimum level of magnification of the LIB spark. The field of view of each sight line was calibrated prior to the tests using a fine-division ruler that was mounted in the test section at the location of the LIB spark, and roughly aligned with the flow direction. Both sight lines were aligned with the horizontal plane of the test section, but were offset by 46° around a vertical axis through the spark, as shown in FIG. 25.

The motion of the spark was measured using a high-speed camera with a frame size of 128×64 pixels and a frame rate $f_C$ of either 390 kHz or 530 kHz. A telephoto lens was used to increase the resolution of the spark images. The streamwise field of view of the camera images was approximately 13 mm, giving a pixel resolution of 0.1 mm/pixel. For these tests, the maximum possible shutter time of $1/f_C$ was used, on the order of 2 µs, in order to increase the spark brightness in the images and hence maximize the number of frames that showed a spark.

Referring now to FIG. 26, an example of a sequence camera frames acquired using the high-speed camera is depicted. The frames were acquired at a frame rate of 390 kHz. The motion of the spark with the flow from left to right can be seen in the frames. Note that the top spark image in each frame was recorded by the line of sight 34° downstream of the spark (see FIG. 26) while the bottom images correspond to the 12° upstream line of sight; as such, the frame-to-frame displacement of the bottom spark image appears greater than the top spark image due to the 12° upstream line of sight being more perpendicular to the actual streamwise motion of the spark.

In the first two frames in FIG. 26, the spark images are saturated and were not used. As shown below, neutral density filters could be used in future versions of the instrument to increase the dynamic range of the instrument, and hence the number of useable frames.

For the non-saturated frames, the apparent location of the spark for each sight line in each frame was computed using simple centroiding computations (which were also used for the subsonic tests described above):

$$C_{Xi} = \frac{\int x_i I_i dx}{\int I_i dx}, \quad C_{Yi} = \frac{\int y_i I_i dy}{\int I_i dy} \quad (7)$$

where the integrations of Equations (7) are performed over the pixels of each image, (x,y) are the coordinates of the pixels, and I is the image intensity of the pixels. In Equations (7), the index i refers to the cameras. The apparent streamwise and vertical velocity components in the image plane of each camera are then determined from two frames separated by a time $\Delta t_f$:

$$V_{Xi} = \frac{C_{Xi_2} - C_{Xi_1}}{\Delta t_f}, \quad V_{Zi} = \frac{C_{Zi_2} - C_{Zi_1}}{\Delta t_f} \quad (8)$$

If the two cameras are aligned with the X-Y plane of the flight vehicle, as shown in FIG. 25, then the flow velocity components $V_x$, $V_y$, $V_z$, can be determined from the apparent velocities measured in the two camera image planes ($V_{X1}$, $V_{Z1}$ and $V_{X2}$, $V_{Z2}$) by simultaneous solution of:

$$c. \quad V_{X1} = V_X \frac{\cos(\theta_1 + \beta)}{\cos(\beta)} \quad (9)$$

-continued $$d.\ V_{X2} = V_X \frac{\cos(\beta - \theta_2)}{\cos(\beta)} \quad (10)$$

$$e.\ \alpha = \operatorname{atan}\left(\frac{V_Z}{V_X}\right) \quad (11)$$

$$f.\ \beta = \operatorname{atan}\left(\frac{V_Y}{V_X}\right) \quad (12)$$

$$g.\ V_Z = V_{Z1} = V_{Z2} \quad (13)$$

where $\theta_1$, $\theta_2$ are the viewing angles of the two cameras to the LIB spark in the X-Y plane as shown in FIG. 25 and $\alpha$, $\beta$ are the flow pitch and yaw angles. In effect, due to the geometrical arrangement of the optical setup, a direct measurement of the flow velocity component $V_z$ is produced by both cameras, while each camera records an apparent horizontal velocity that is the projection of the true $V_X$ and $V_Y$ components along the sight line of the camera. Collectively, Equations (7) to (13) therefore constitute the mathematical basis for an image-processing algorithm that could be implemented into the control system of a flight vehicle.

The velocity components for the single measurement shown in FIG. 26, computed using Equations (7) to (13), are $V_X$=682.5 m/s, $V_Y$=27.1 m/s, and $V_Z$=−25.4 m/s. The mean $V_X$ result is 682 m/s, which is ~2.5% lower than the nominal flow speed of 700 m/s determined using an isentropic-flow analysis of the tunnel test conditions; this offset can be most likely attributed to the scaling of the camera field of view, and could be corrected by an improved calibration methodology. The absolute flow-angle offsets can also be attributed to a slight misalignment of the instrument with the flow direction of the wind tunnel.

The rms of the velocity components are shown in FIG. 27 for different time separations of the camera images $\Delta t_f$ up to the maximum possible time separation that was permitted by the number of useable camera frames. If the centroiding calculations have an uncertainty $u_C$, and if this is the dominant uncertainty affecting the velocity calculations, then from Equation (8):

$$u_V \approx \frac{\sqrt{2}\,u_C}{\Delta t_f} \quad (14)$$

Furthermore, the centroiding computations are assumed to be limited by a minimum resolvable pixel displacement $\Delta p$. Hence, the minimum $u_C$=R$\Delta p$ where R is the pixel resolution in mm/pixel, and Equation (14) becomes:

$$u_V \approx \frac{\sqrt{2}\,R\Delta p}{\Delta t_f} \quad (15)$$

As shown by Eqs. (3)-(7), the component $V_Z$ is directly measured by both cameras while the components $V_X$ and $V_Y$ are determined from stereoscopic analysis. An uncertainty analysis of Equations (7) to (13) also shows how the ratio of the uncertainties $uV_Y/uV_X$ depends on the total angle between the two cameras, $\theta_1+\theta_2$, and is plotted in FIG. 28, which shows that the uncertainty of the velocity components determined by the stereoscopic analysis is minimized if the angular separation of the cameras is 90°.

Equation (15) is also shown in the plots of FIG. 27 and was computed using minimum resolvable pixel resolutions of $\Delta p$=0.1 and 0.05 pixels, which is a typical range of values that should be achievable for centroiding calculations. For $V_{Xrms}$, FIG. 27 shows that Run 1 Matches Equation (15) for $\Delta p$=0.1 pixels reasonably well while Run 2 does not. Note that $V_{Xrms}$ for $\Delta t_f$=10 μs is significantly larger than the trend for both Runs, and this is most likely because the $\Delta t_f$=10 μs calculations used frames in which the spark was too dim for an accurate centroid calculation (i.e., see last frame in FIG. 26). For $V_{Zrms}$, FIG. 27 shows that neither Runs 1 nor 2 matches Equation (15). In general FIG. 27 indicates that no firm conclusion can be made whether the minimum resolvable pixel resolution is the determining factor in the uncertainty of the wind speed results.

In the most conservative case, Run 1 in FIG. 27 indicates that the wind speed uncertainty is strongly reduced as the frame separation $\Delta t_f$ is increased, and that the longest possible $\Delta t_f$ should be used. On the other hand, Run 2 and the $V_{Zrms}$ results indicate that smallest measurement uncertainty can be achieved with the smallest frame separation. Although further investigation is required, it will be assumed from FIG. 27 that the minimum wind speed uncertainty can be achieved with $\Delta t_f$ in the range 2.5 μs (least conservative) to 7.5 μs (most conservative).

FIG. 27 also shows the ratio $V_{Yrms}/V_{Xrms}$ for all $\Delta t_f$. For the 46° total angle between the two camera sight lines (see FIG. 25), FIG. 27 shows that the measured ratio $V_{Yrms}/V_{Xrms}$ closely matches the prediction of FIG. 28.

TABLE 2

| Mach number | $U_\infty$ (m/s) | $u_\alpha$, $u_\beta$ (deg) |
| --- | --- | --- |
| 1 | 295 | 0.78 |
| 2 | 590 | 0.39 |
| 3 | 885 | 0.26 |
| 4 | 1180 | 0.19 |
| 5 | 1475 | 0.16 |

In summary, FIG. 27 shows that a minimum rms of the velocity measurements of approximately 2 m/s can be achieved for all 3 velocity components, or approximately ±4 m/s uncertainty at the 95% confidence level. Table 2 shows how these velocity uncertainties would influence the uncertainty of flow-angle measurements during flight at different Mach numbers, computed using:

$$u_\alpha, u_\beta \approx \frac{4\ \text{m/s}}{U_\infty} \quad (16)$$

where standard-atmosphere conditions at an altitude of 20 km were assumed in the calculation of the data in Table 2. The table shows that flow angles can be measured to within approximately 0.5° for flight Mach numbers less than 2. However, as mentioned above, some of the scatter in the windspeed measurements may have been caused by wind-on vibrations of the optical setup.

Measurements of the aero-optical effect of a shock were performed in the TWT at a test-section Mach number of $M_\infty$=3. For the tests, a 20° wedge model was installed in the middle of the test section, with one side of the wedge parallel to the incoming flow. Using the optical setup shown in FIG. 19, the collimated, CW laser beam was reflected from a mirror mounted in the wedge face approximately 125 mm downstream of the leading edge of the wedge, as depicted in FIG. 29A and FIG. 29B. As shown in FIG. 29A and FIG. 29B, two tests were performed: for the first test shown in FIG. 29A, the wedge was aligned to produce a shock through the interrogating CW beam. A second test with wedge aligned to produce no shock through the beam, FIG. 29B, was also performed to evaluate the effect of the model on the wall boundary layer, which also imposed an aero-optical effect on the CW beam.

The spectrum of the aero-optical effect of the shock was measured in a manner similar to the measurement of the canonical boundary-layer spectrum described above. Specifically, the motion of a few dots from the lenslet array mounted to the CCD camera were measured at high rate, and used to compute the jitter spectrum. FIG. 30 shows the measured spectra for the canonical boundary layer (blue line), the wedge with wall boundary layer measured using the setup of FIG. 29 right (green line), and the wedge with a shock passing through the beam as shown in FIG. 29 left (red line). In FIG. 30, the frequency data are presented in Hz and not nondimensionalized to produce a Strouhal number in order to more clearly show the frequency content of the measurements; furthermore, the top axis of FIG. 30 shows the equivalent wavelength $\lambda$ of the convecting aero-optic structures computed using:

$$\lambda \approx \frac{U_\infty}{f} \tag{17}$$

where the freestream velocity $U_\infty$ of the flow at was computed to be ~620 m/s from the TWT sensors.

As discussed above, the LIB laser is most preferably focused through the shock wave of the flight vehicle, such that aero-optical aberrations imposed by the vehicle shock may adversely affect the ability to focus the LIB laser and create a LIB spark. However, FIG. 30 clearly shows that the aero-optical effect of the shock occurs primarily at comparatively low frequencies, below 10 kHz, and at long wavelengths between ~0.12 m to 0.63 m. FIG. 30 also shows some discrepancy between the high-frequency part of the spectra for the "BL with shock" and "BL only" cases; however, since this discrepancy also occurred with the wedge orientated so that a shock did not form in the beam, it is speculated that the discrepancy in this high-frequency region was caused by some indirect effect of the wedge on the boundary-layer flow, and not because of the shock.

On the other hand, as will be shown in a following section describing design of the air-data probe, the optical aperture for the LIB will be approximately 25 mm in diameter or less. Furthermore, as the LIB laser focuses towards the LIB spark, the diameter of the LIB laser will be even smaller than 25 mm by the time it passes through the vehicle shock wave. This means that the diameter of the effective aperture of the LIB laser will be much smaller than the wavelength of the shock aero-optical disturbances, so that the aero-optical effect of the shock will be greatly reduced by the "aperture filtering" effect; specifically, the optical aperture behaves as a high-pass filter that strongly filters out the effects of disturbances with wavelengths that are larger than the optical aperture.

The effect of a circular aperture with diameter $D_{AP}$ on aero-optical disturbances with wavelength $\lambda$ is shown in FIG. 31. From FIG. 30, the shortest-wavelength component of the shock aero-optical effect is $\lambda$~0.12 m, giving $St_{Ap}=D_{AP}/\lambda$~0.2 for $D_{AP}$ ~25 mm. As shown in FIG. 31, a 25 mm aperture for the LIB laser would filter this shortest-wavelength component by over 20 dB, so that the aero-optical effect of the shock would reduced by over 99%. For smaller apertures, or longer-wavelength frequency components of the shock, the amount of attenuation of the shock aero-optical effect would be even greater. As such, the adverse effect of the shock on the ability to focus the LIB laser and create a breakdown spark is expected to be negligible.

In addition to the higher-order aberrations that the shock may impose on the LIB laser beam previously described, the shock may also impose a low-order tilt effect that would deflect the LIB laser beam without aberrating it. This kind of refraction of the LIB laser beam would shift the location of the formation of the LIB spark, without degrading the ability to form the LIB spark.

Refraction through the shock is produced as light passes through the large density gradient across the shock. A diagram showing the refraction of light beams across the shock is shown in FIG. 32, where the angles $\theta_1$ and $\theta_2$ are related by Snell's law:

$$\frac{\sin\theta_1}{\sin\theta_2} \approx \frac{n_2}{n_1} \tag{18}$$

where $n_1$ and $n_2$ are determined using the Gladstone-Dale relation, Equation (1). However, due to the very small value of the Gladstone Dale constant for air, ~2.25×10$^{-4}$ kg/m$^3$, the change in refractive index across the shock is very small, on the order ~10$^{-4}$ or smaller. This means that refraction effects by the shock would have a negligible effect over the very short distances in which the LIB laser would be focused, on the order of 1 m or less, although the shock refraction might have a more important effect if the beam were focused on much longer-range targets such as during directed-energy applications.

Another area for consideration is the possibility of atmospheric dissociation taking place at the conditions of interest. The nature of the methods described herein is such that the presence of monatomic oxygen in the vicinity of the sensor could possibly degrade its operational capability.

This degradation of the technology when significant dissociation of the surrounding air takes place might prove challenging to overcome for systems approaching orbital insertion or reentry speeds. Dissociation is not typically encountered, however, for temperatures less than 2000K, and initial estimates of the flight and test conditions indicated that there was little likelihood of dissociation.

The HIFiRE-5 test vehicle was simulated at two conditions. The first was based on the most extreme conditions expected in the course of the planned Trisonic Wind Tunnel entries. The second was based on the most extreme conditions encountered during the HIFiRE-5 flight test.

The wind tunnel used in the development of the most preferred embodiments of the present invention is capable of testing at a number of different Mach numbers. For most tests, the highest Mach number achievable was 4.38. This corresponds to a test section static temperature of roughly 114.5 R and a static pressure of about 1 psi. This corresponds to a total temperature of roughly 550 R and a total pressure of 250 psi. The vehicle walls were assumed to have a constant temperature of 480 degrees R.

The basic layout of the air data probe is shown in FIG. 33. The instrument consists of a pulsed laser with output focused to generate a LIB spark, and cameras spaced an angular distance $\theta_1+\theta_2$ to stereoscopically measure the 3 components of motion of the spark. The cameras for each sight line are triggered near the start of the LIB emission and again after a delay $\Delta t_f$. Each camera has appropriate lenses to generate the appropriate pixel resolution of the LIB spark, neutral-density filters to improve the dynamic range of the cameras, and a shutter to control the exposure of the camera CCD arrays; performance requirements for these components are described in further detail below.

The camera shutter time for the tests was 2.2 μs, which produced accurate centroiding and velocity results. This means that, for the 700 m/s windspeed of the TWT tests, the LIB spark moved approximately 1.5 mm during the time the shutter was open. As such, given the maximum anticipated flight speed for the flight vehicle, $V_{MAX}$, the camera shutter time $\Delta t_S$ should therefore conform to the following condition:

$$\Delta t_S \leq \frac{1.5 \text{ mm}}{V_{MAX}} \quad (4.6.1)$$

For the TWT tests, in the most conservative case, a frame delay of $\Delta t_f=7.5$ ms between the first and second images of the LIB spark was found to produce a measurement accuracy of $u_i \sim \pm 4$ m/s (95% confidence), see FIG. 27, which was also found to produce an acceptable flow-angle accuracy of ±0.2° or better. As such, the frame delay between camera images should meet the following requirement:

$$\Delta t_f \geq 7.5 \text{ μs} \quad (4.6.2)$$

The cameras should be capable of recording the spark over the full anticipated speed range of the flight vehicle. This is accomplished if the pixel range PR of the camera satisfies the following:

$$PR > \frac{V_{MAX} \Delta t_f}{R} \quad (4.6.3)$$

where $V_{MAX}$ is the maximum anticipated vehicle flight speed and R is the pixel resolution in mm/pixel. In the wind-tunnel tests performed as part of the Phase II effort, a pixel resolution of R~0.1 mm/pixel was typically used, which was found to give good results. Note that, for atmospheric flight at $M_\infty=5$, the vehicle flight speed is approximately 1500 m/s; using R=0.1 mm/pixel and $\Delta t_f=7.5$ μs gives PR~120 pixels, showing that the instrument objectives can be accomplished with relatively small pixel ranges.

The primary requirement for the laser is to produce a LIB spark that has a useable lifetime longer than the selected measurement time $\Delta t_f$. Laser induced breakdown can be produced by any pulsed laser with sufficient pulse energy; however, LIB is easiest to produce is the IR and UV ranges since the breakdown threshold for air is lowest at these wavelengths.

Possibly the most important parameter for the LIB laser is the required pulse energy, since this dictates the size and power consumption of the air-data probe, and possible need for cooling. As a first approximation, it can be assumed that the required pulse energy varies in the same way as the breakdown threshold, Equation (2). From Equation (2), the breakdown threshold depends on the local air pressure; however, since air temperature is nearly constant at the operating altitudes of interest, then Equation (2) can also be used to scale approximately for air density:

$$I_{th} \propto \rho_\infty^{-0.733} \quad (4.6.4)$$

During the tests, it was shown that a ~100 mJ laser with pulse width $\Delta t=5$ ns operating at $\lambda=1.064$ μm and $f_L/D_L=10$ could produce a spark in a 700 m/s flow with $\rho_\infty=0.31$ kg/m3 with a useable lifetime of approximately $\Delta t_f=12.5$ ms (first 6 frames of FIG. 26). If the pulse energy is scaled using the test laser parameters, then Equation (4.6.4) becomes:

$$E = 100 \text{ mJ} \left( \frac{0.31 \text{ kg/m}^3}{\rho_\infty} \right)^{0.733} \left( \frac{\Delta t_f}{12.5 \text{ μs}} \right) \quad (4.6.5)$$

Note that a further approximation for using a measurement time $\Delta t_f$ that is different from the full 12.5 μs useable lifetime of the tests has also been included as the last ratio in Equation (4.6.5). Equation (4.6.5) is an approximate scaling relation and further investigation is required; however, the equation provides a reasonable method of estimating the required pulse energy for a ~1 μm wavelength laser.

As shown in FIG. 26, the brightness of the LIB spark varies considerably during the spark lifetime. To account for the large variation in LIB brightness, neutral-density (ND) filters can be used to ensure that the spark image is not saturated in the camera images. FIG. 34 shows the peak pixel signal in a high-speed camera measurement of a LIB spark event; the data were acquired using neutral density filters to increase the dynamic range of the measurements. As shown by the figure, the brightness of the LIB spark varies by several order of magnitude during the spark lifetime; as such, ND filters that reduce the spark brightness by a factor of 10 to 1000 will typically be required. This means that additional reduction in spark brightness due to other optical elements used to condition the light entering the cameras will generally be negligible in comparison.

The spark brightness for a given laser pulse energy also changes with flight altitude due to the reduced density at higher altitudes. This effect can be seen in FIG. 35 which shows the peak spark brightness as a function of air density and equivalent standard-atmosphere altitude; to obtain the data in FIG. 35, the LIB spark was created in a vacuum chamber and the brightness was measured using a photodiode. The fact that the spark brightness changes with air density means that a method of adjusting the spark brightness is required in order to avoid image saturation as the altitude of the flight vehicle changes. One possible way to accomplish this is to adjust the laser pulse energy using the total camera-image intensity as feedback. Alternatively, multiple ND filters could be used to increase the dynamic range of the cameras as depicted in FIG. 36. Note that, as shown above, the range of pixels required to measure the spark motion is expected to be small, around 120×50 pixels, so that there should be ample space on a typically-sized CCD array to implement the arrangement shown in FIG. 36.

Based on the design principles described above, the following design for the air data probe is suggested, optimized for use on a hypersonic flight-test vehicle designed for flight at a maximum $M_\infty=5$ and a maximum altitude of 20 km. The flight-test requirements for the air-data probe are shown in Table 4.6.1.

The air-data probe has the basic layout shown in FIG. 33. The LIB spark is created using a laser and focusing optics based on the preceding discussion. Cameras with sensitivity similar to or better than the Photron v711 used in the tests are used. The cameras also use neutral-density filters such as shown in FIG. 36 to increase the dynamic range of the instrument. With the increased dynamic range, it is assumed that the full spark lifetime is employed, with none of the spark lifetime lost due to possible overexposure of the cameras.

TABLE 4.6.1

| Parameter | Value |
|---|---|
| Maximum $M_\infty$ | 5 |
| Maximum velocity, $V_{MAX}$ | 1500 |
| Maximum pitch/yaw | 10° |
| Required pitch/yaw accuracy | ±0.5° |
| Maximum altitude (km) | 20 |
| Minimum $r_\infty$ (kg/m3) | 0.09 |

As depicted in FIG. 33, the LIB spark is formed outside of the vehicle shock wave in order to measure the freestream velocity. On the other hand, as indicated by Equation (3), it may be advantageous to form the LIB spark as close to the vehicle body as possible in order to reduce the f-number $f_L/D_L$ of the laser optics and hence reduce the necessary laser pulse energy (and power requirements). For hypersonic flight speeds, the shock angle will be very small so that the shock wave will be close to the vehicle body and this will facilitate projection of the LIB spark close to the vehicle body; however, the LIB spark is most preferably be placed outside of the vehicle shock at even the lowest Mach numbers to be measured. The precise location of the LIB spark will depend on the vehicle layout and restrictions on how the air-data probe can be integrated into the vehicle, so that general guidelines on the spark location and value $D_S$ and laser-optics f number are difficult to define without further information. However, it will be assumed that the air-data probe can be placed at a location on the vehicle body where the LIB spark can be formed not far from the vehicle body.

A frame separation time $\Delta t_f$=7.5 μs is used, which was found to produce accurate results in previous tests (see FIG. 27). For each camera sight line, the first image is taken immediately after the ignition of the LIB spark, and the second image is taken 7.5 μs later. If a suitable shutter system is available, both images could possibly be recorded by the same camera CCD array in order to save instrument space; otherwise 4 cameras could be used: one to acquire the first and second images for each sight line.

The laser parameters are summarized in Table 4.6.2 for λ=1064 nm, and are similar to the laser used for the TWT tests. The laser would ideally operate in the UV or IR and could be a Nd:YAG laser, although other lasers could be used. The maximum pulse energy was estimated using Equation (4.6.5) for the minimum $\rho_\infty$ of the test for two frame separation $\Delta t_f$=2.5 ms and 7.5 μs, which are the least conservative and most-conservative estimates of the required frame separations determined from the previous tests.

TABLE 4.6.2

| Parameter | Value |
|---|---|
| Laser type | Nd: YAG (example) |
| Wavelength | 1064 nm (355 nm could also be used) |
| Pulse duration | 5 ns |
| Most conservative estimate of pulse energy ($\Delta t_f$ = 7.5 μs) | 165 mJ |
| Least conservative estimate of pulse energy ($\Delta t_f$ = 2.5 μs) | 55 mJ |
| Lens $f_L/D_L$ | ~10 |

Other instrument parameters computed using the methods of the preceding sub-sections are summarized in Table 4.6.3. As above, the centroiding algorithm is assumed to have a minimum resolvable pixel displacement of 0.1 pixels. The camera resolution and lenses are chosen to give a pixel resolution of 0.1 mm/pixel. In order to minimize the uncertainty of the two camera sight lines, the camera angles $\theta_1$ and $\theta_2$ are set at 45°. The camera shutter time was determined using Equation (4.6.1), and the CCD pixel range was determined using Equation (4.6.3). Using the design parameters shown in Table 4.6.3, the instrument is expected to give the same measurement uncertainty obtained in the TWT tests for all three velocity components of ±4 m/s. The flow-angle performance of the instrument is the same as shown in Table 2.

TABLE 4.6.1

| Parameter | Value |
|---|---|
| Minimum resolvable pixel displacement, Δp (pixels) | 0.1 |
| Pixel resolution (mm/pixel) | 0.1 |
| Camera frame separation, $\Delta t_f$ (ms) | 7.5 |
| Camera shutter time, $\Delta t_s$ (ms) | 1 |
| Camera angles, $\theta_1$, $\theta_2$, (deg) | 45 |
| Pixel range for each image, PR (pixels) | 120 × 50 |

The diagram in FIG. 37 shows important parameters for the layout of the wavefront-sensor of the boundary-layer instrument. In the following sections, requirements are defined for specific components of the wavefront sensor in order to achieve the measurement objectives for the instrument.

The jitter spectrum obtained from the instrument should facilitate the spectral matching shown in FIG. 16 and FIG. 17. Specifically, the spectrum should start at $St_\delta$<1 and finish at $St_\delta$>1 in order to clearly show the spectral peak at $St_\delta$=1. Furthermore, the spectrum should have enough points to enable accurate spectral matching.

The minimum frequency in the jitter spectrum is the inverse of the time for an optical structure to traverse the full measurement aperture, $U_C/D_{AP}$. Creating a Strouhal number based on δ gives:

$$St_{min} = \frac{\delta}{D_{AP}} \quad (4.7.1)$$

As such, to satisfy $St_{MIN}$<1 means that $D_{AP}$ should be substantially greater than the boundary-layer thickness δ; as a rule of thumb:

$$D_{AP} > 2\delta \quad (4.7.2)$$

The minimum Strouhal number is also the separation between points in the spectrum; as such, the maximum Strouhal number is:

$$St_{MAX} = \frac{n_{LL}\delta}{2D_{AP}} \quad (4.7.3)$$

where $n_{LL}$ is the number of lenslets in the lenslet array. The conditions $St_{MAX}$>1 therefore gives:

$$n_{LL} > \frac{2D_{AP}}{\delta} \quad (4.7.4)$$

Equations (4.7.3) and (4.7.5) therefore constitute guidelines on the aperture size and number of lenslets to facilitate the spectral matching.

The wavefront sensor should have the sensitivity to measure the minimum expected signal magnitude, where the signal magnitude is characterized by the $OPD_{RMS}$ of the boundary-layer wavefront distortion. This means that a sufficiently fine-spaced CCD pixel spacing should be used so that the spot displacement produced by the minimum-amplitude wavefront signal is greater than the minimum measurable spot displacement $D_{MIN}$. For the purpose of estimating spot displacements on the CCD array, the $OPD_{RMS}$ of target test conditions can be calculated using Equation (4).

The sensitivity of the wavefront sensor is controlled by the focal length of the lenslet array $f_{LL}$. As shown in FIG. 38, the spot displacement $D_S=\theta f_{LL}$, which means that as the signal strength and wavefront slopes q decrease, $f_{LL}$ should be increased so that the spot displacement $D_S$ is larger than the minimum measurable spot displacement $D_{MIN}$. However, the local wavelength slopes are also magnified as the wavefront passes through the beam reducer, so that:

$$\Delta_S = \frac{D_C}{D_W}\theta f_{LL} = \frac{f_1}{f_2}\theta f_{LL} \tag{4.7.5}$$

For the purpose of instrument design, a relationship between the root-mean-square (rms) wavefront slope and the wavefront $OPD_{RMS}$ for boundary-layer flows is estimated from the TWT data shown in FIG. 39. A linear fit to the data shown in the figure gives:

$$\frac{\theta_{rms}(\text{rad})}{(U_\infty/U_C)(OPD_{rms}/\delta)} = 0.812 M_\infty + 3.98 \tag{4.7.6}$$

Analysis of the TWT data shows that accurate wavefronts can still be computed using a wavefront-processing software if the rms dot displacement is as low as 0.06 pixels:

$$D_{MINrms} > 0.06 \text{ pixels} \tag{4.7.7}$$

From Equation (4.7.5), for a given $f_{LL}$, the maximum CCD pixel size to achieve the instrument sensitivity goal is therefore $$D_{pixel} < \frac{\frac{f_1}{f_2}\theta_{rms,min}f_{LL}}{\Delta_{MINrms}} \tag{4.7.8}$$

where $\theta_{rms,min}$ is estimated from Equation (4.7.6) for the minimum $OPD_{RMS}$ condition and $\Delta_{MINrms}$ is given by Equation (4.7.8).

For an LIB light source, the spots on the CCD array are images of the LIB spark itself, and the distance between lenslets should therefore be larger than the spark image size. From, the spark image size on the CCD array is:

$$D_{SCCD} \sim \frac{f_{LL}D_S}{f_C}\frac{f_1}{f_2} \tag{4.7.9}$$

If the lenslets are sized at least 50% greater than $D_{SCCD}$, then $$D_{LL} \geq \frac{1.5 f_{LL} D_S}{f_C}\frac{f_1}{f_2} = \frac{1.5 f_{LL} D_S}{f_C}\frac{D_{AP}}{D_W} \tag{4.7.10}$$

where the relation $f_2/f_1 = D_{AP}/D_W$ is used in Equation (4.7.10) with reference to FIG. 37.

In the most preferred embodiments of the present invention, the CCD array may be considered to be most efficient when the telescope (composed of lenses $f_1$ and $f_2$) produce a beam diameter $D_W$ that fills most of the CCD array. For example, if the CCD array is sized 20% greater than the spot size $D_W$, then:

$$D_W = D_{AP}\frac{f_2}{f_1} \sim 0.8 D_{CCD} \tag{4.7.11}$$

The number of pixels in the CCD array is:

$$N_{pixels} = \frac{D_{CCD}}{D_{pixel}} \tag{4.7.12}$$

where CCD arrays typically have $2^n$ pixels where n is an integer.

Referring now to FIG. 37, the f-number of the collimating lens is $f_C/D_{AP}$. In experiments described in and also from the TWT tests, good results were obtained if the collimating f-number is no less than 8, although it may be possible to use lower f-number's using improved optical design:

$$f_C^\# = \frac{f_C}{D_{AP}} \geq 8 \tag{4.7.13}$$

Note that lower collimating f-number also increases the spark image size on the CCD array and hence required lenslet spacing as shown by Equation (4.7.10).

The integration time for the wavefront images should be sufficiently short "freeze" the flow. The motion of the flow $D_F$ during the image integration time $\Delta t_i$ is $$\Delta_F = V_\infty \Delta t_i \tag{4.7.14}$$

Boundary-layer aero-optic structure sizes are on the order of the boundary-layer thickness $\delta$, so that the flow is effectively frozen if:

$$\Delta_F = \delta \tag{4.7.15}$$

In Eq. (4.7.14), $\Delta t_i$ is either the sensor shutter time or the illumination time of the LIB spark, whichever is smaller. As described below, good illumination of the wavefront images is obtained if the LIB spark is only a few mJ above the breakdown threshold and, for these cases, the illumination time of the LIB spark is on the order of 1 μs or less. As such, the camera shutter speed is only a design consideration if image integration times of less than 1 μs are required to satisfy Eq. (4.7.15).

The sensitivity of the camera CCD array is most preferably high enough for good signal amplitude (i.e. dot-pattern images with enough intensity). In general, the signal amplitude results from an interplay between the LIB laser energy and hence spark brightness, the camera shutter time $\Delta t_i$, and the camera sensitivity, and further investigation is required to enable full optimization of these three parameters.

As discussed above, for the wavefront measurements, it is advantageous to use a shorter wavelength to form the LIB spark since this produces smaller spark sizes, which then produce smaller images on the CCD array, see Equation (4.7.9). During recent tests conducted in the USAF Academy TWT, a frequency-tripled Nd:YAG laser with λ=355 nm was used. Furthermore, as shown in a more stable LIB spark that produces better wavefront performance results if the $f_L/D_L$ of the lens used to focus the laser is less than ~15. In the recent tests performed in the TWT, $f_L/D_L$=10 was used.

As pointed out above, the most important parameter for the laser is the pulse energy since this largely affects the power requirements of the instrument. In previous tests, good wavefront results were obtained using E=20 mJ during the $M_\infty$=4.38 tests where $\rho_\infty$=0.36 kg/m³. If it is assumed that the required laser energy will scale with the breakdown threshold, then from the breakdown threshold for UV laser radiation at λ=355 nm is shown to vary as $I_{th} \sim \rho_\infty^{-0.63}$. As such, the required laser pulse energy at other operating altitudes can be scaled from the test results using:

$$E = 20 \text{ mJ} \left( \frac{0.36 \text{ kg/m}^3}{\rho_\infty} \right)^{0.63} \quad (4.7.16)$$

Equation (4.7.16) should be considered an approximate method of estimating the laser pulse energy and further investigation is required.

Following the guidelines of the preceding subsections, a design process for the boundary-layer measurement instrument can therefore be described as follows:

Select $D_{AP}$ to satisfy Equation (4.7.2) for the anticipated boundary-layer thickness.

Select $f_C$ to satisfy Equation (4.7.13)

Select the beam-reducer magnification $f_1/f_2$ to give a beam size $D_W$ in the range of typical CCD arrays.

Select (guess) a suitable $f_{LL}$

Compute $\theta_{rms,min}$ using Equation (4.7.6), the maximum pixel size using Equation (4.7.8), and select a potential, commercially-available CCD array that satisfies this maximum $D_{pixel}$ restriction. It should be noted that a custom CCD array could also be used.

Compute the spark image size $D_{SCCD}$ using Equation (4.7.9)

Select the lenslet size $D_{LL}$ suitably larger (~50% greater) than $D_{SCCD}$, using Equation (4.7.10)

Compute the number of lenslets $n_{LL} = D_W/D_{LL}$ and check that $n_{LL}$ satisfies Equation (4.7.4)

The above steps are iterated until a satisfactory design is produced.

4.7.10 Parameters for a $M_\infty$=5 Optimized Boundary-Layer Instrument

Instrument parameters are computed for the signal parameters listed in Table 4.7.1. The precise signal parameters would originate from an analysis of the flight envelope and objectives for a specific test; however, the values in Table 4.7.1 are estimated flight-test parameters taken from typical flight tests.

TABLE 4.7.1

| Parameter | Minimum signal | Maximum signal |
|---|---|---|
| $M_\infty$ | NA | 5 |
| δ (mm) | 5 | 15 |
| Altitude (km) | 20 | 10 |
| $\rho_\infty$ (kg/m3) | 0.1 | 0.41 |
| $OPD_{RMS}$ (μm) Equation (4) | 0.0063 | 0.092 |
| $\theta_{rms}$ (μrad) Equation (4.7.6) | 11.2 | 54.9 | h. Table 4.7.1: Boundary-layer parameters associated with estimated flight-test envelope for wavefront instrument, and associated signal parameters.

For the above signal parameters, a suitable value for the aperture diameter is $D_{AP}$=30 mm, which gives $D_{AP}$=2× the maximum anticipated δ for the measurements thereby satisfying Equation (4.7.2). Furthermore, the number of lenslets $n_{LL}$ should be greater than 12 to satisfy Equation (4.7.4).

Using the design process of previously described, the instrument parameters shown in Table 4.7.2 were produced. Note that the ability to find a CCD chip with $D_{pixel}$=5 mm, $N_{pixels}$=4096 and $D_{CCD}$=20 mm has not been validated; however, these are realistic values and a custom CCD chip could be manufactured to meet this specification.

TABLE 4.7.2

| Parameter | Value |
|---|---|
| Measurement aperture, $D_{AP}$ (mm) | 30 |
| Collimating lens focal length, $f_C$ (mm) | 240 |
| Telescope magnification $f_1/f_2$ | 1.667 |
| Beam size on CCD, $D_W$ (mm) | 18 |
| Lenslet focal length, $f_{LL}$ (mm) | 50 |
| Pixel size, $D_{pixel}$ (μm) | 5 |
| Minimum rms dot displacement, $D_{MINrms}$ (pixels) | 0.19 |
| CCD pixels, $N_{pixels}$ | 4096 |
| CCD size, $D_{CCD}$ (mm) | 20 |
| Spark image size on CCD, $D_{SCCD}$ (mm) | 0.35 |
| Lenslet size, $D_{LL}$ (mm) | 0.52 |
| # of lenslets across beam, $n_{LL}$ | 34 |
| Flow motion $D_F$ in 1 μs (mm) | 1.5 |

Table 4.7.2 also shows the computed flow motion $D_F$ for an estimated 1 μs spark illumination time. This $D_F$ is approximately ⅓ of the minimum boundary-layer thickness of 5 mm shown in Table 4.7.1, so that wavefronts for the minimum δ condition may be affected by flow motion. To reduce $D_F$ to less than 1/10 of the minimum δ a shutter with integration time of ~0.33 μs should be used, or alternatively, a neutral-density filter could be used to reduce the effective spark lifetime.

Based on the most preferred embodiments of the present invention, a starting specification for the LIB laser is given in Table 4.7.3. The laser pulse energy was estimated using Equation (4.7.16) for the minimum $r_\infty$ shown in Table 4.7.1. As for all instrumentation, the laser should also meet g-force requirements and other environmental conditions of the flight test. Other lasers that could be considered include diode lasers (if sufficiently powerful) or excimer lasers.

TABLE 4.7.3

| Parameter | Value |
|---|---|
| Laser type | Nd: YAG (example) |
| Wavelength | 355 nm |
| Pulse duration | 5 ns |

TABLE 4.7.3-continued

| Parameter | Value |
| --- | --- |
| Max Pulse energy | 45 mJ |
| Lens $f_L/D_L$ | 10 |
| Typical spark size $D_S$ | 1 mm |

From the foregoing description, it should be appreciated that the unique laser-induced measuring process for windspeed and flow angle in a hypersonic flight environment provided by the various preferred embodiments of the present invention offer significant benefits that would be apparent to one skilled in the art. Furthermore, while multiple preferred embodiments have been presented in the foregoing description, it should be appreciated that a vast number of variations in the preferred embodiments exist. Lastly, it should be appreciated that these embodiments are preferred exemplary embodiments only and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. A method of measuring at least one component of freestream velocity for a vehicle comprising the steps of:
   providing at least one laser;
   providing a plurality of cameras;
   generating a laser-induced breakdown spark from the at least one laser at a point away from the vehicle;
   positioning at least one neutral density filter between the cameras and the laser-induced breakdown spark;
   using the plurality of cameras to monitor and capture a plurality of physical characteristics associated with the laser-induced breakdown spark over time; and
   calculating at least one component of freestream velocity by using the monitored plurality of physical characteristics associated with the laser-induced breakdown spark.

2. The method of claim 1 wherein the step of positioning the at least one neutral density filter between the cameras and the laser-induced breakdown spark comprises the steps of:
   positioning a plurality of neutral density filters between the cameras and the laser-induced breakdown spark; and
   selectively altering which of the plurality of neutral density filters is positioned between the cameras and the laser-induced breakdown spark based on at least one of: passage of time; or changes in air density surrounding the laser-induced breakdown spark.

3. The method of claim 1 wherein the step of positioning the at least one neutral density filter between the cameras and the laser-induced breakdown spark comprises the steps of:
   positioning at least one neutral density filter between the cameras and the laser-induced breakdown spark at a first point; and
   moving the at least one neutral density filter to a second point based on the change in intensity of the laser-induced breakdown spark due to at least one of: passage of time; or changes in air density surrounding the laser-induced breakdown spark.

4. The method of claim 1 wherein the at least one component of freestream velocity comprises a directional component for at least one of: streamwise freestream velocity, transverse freestream velocity, and normal freestream velocity.

5. The method of claim 1 wherein the plurality of cameras comprises at least one charged coupled device camera.

6. The method of claim 1 wherein an intensity associated with the laser-induced breakdown spark is regulated by adjusting an energy output of the at least one laser using a feedback monitoring cycle to reduce or increase the energy output of the at least one laser.

7. The method of claim 1 wherein the vehicle comprises a hypersonic flight-test vehicle.

8. A system for measuring at least one component of freestream velocity comprising:
   a vehicle;
   at least one laser, the at least one laser producing a laser-induced breakdown spark at point away from the vehicle;
   a plurality of cameras contained within the vehicle, the plurality of cameras being positioned to monitor and capture a plurality of physical characteristics associated with the laser-induced breakdown spark over time;
   at least one neutral density filter positioned between the laser-induced breakdown spark and the plurality of cameras; and
   at least one component of freestream velocity calculated from the plurality of physical characteristics associated with the laser-induced breakdown spark over time.

9. The system of claim 8 wherein the at least one neutral density filter positioned between the cameras and the laser-induced breakdown spark comprises a plurality of neutral density filters between the cameras and the laser-induced breakdown spark wherein at least one of the plurality of neutral density filters is selectively positioned between the cameras and the laser-induced breakdown spark.

10. The system of claim 8 wherein the at least one neutral density filter positioned between the cameras and the laser-induced breakdown spark comprises at least one neutral density filter between the cameras and the laser-induced breakdown spark at a first point wherein the at least one neutral density filter is positioned at a second point based on the change in intensity of the laser-induced breakdown spark over time.

11. The system of claim 8 wherein the at least one component of freestream velocity comprises a directional component for at least one of: streamwise freestream velocity, transverse freestream velocity, and normal freestream velocity.

12. The method of claim 8 wherein the plurality of cameras comprises at least one charged coupled device camera.

13. The method of claim 8 wherein an intensity associated with the laser-induced breakdown spark is regulated by adjusting an energy output of the at least one laser using a feedback monitoring cycle to reduce or increase the energy output of the at least one laser.

14. The method of claim 8 wherein the vehicle comprises a hypersonic flight-test vehicle.

15. An aero-optical instrument comprising:
   one or more pulsed lasers generating a laser-induced breakdown spark;
   a plurality of optical components sufficient to collect light from the laser-induced breakdown spark after it passes through an aircraft boundary layer, the plurality of optical components conditioning and transmitting that light;

one or more wavefront sensors measuring a plurality of wavefronts through the aircraft boundary layer based on the light collected from the laser-induced breakdown spark; and at least optical device positioned to capture and measure an amount of light produced by the laser-induced breakdown spark.

16. The aero-optical instrument of claim 15 further comprising at least one neutral density filter selectively and moveably positioned between the at least one optical device and the laser-induced breakdown spark, wherein the at least one neutral density filter is moved from a first position to a second position to control the intensity of the amount of light from the laser-induced breakdown spark reaching the at least one optical device.

17. The aero-optical instrument of claim 15 further comprising a plurality of neutral density filters between the at least one optical device and the laser-induced breakdown spark wherein at least one of the plurality of neutral density filters is selectively positioned between the and the laser-induced breakdown spark to control the intensity of the amount of light from the laser-induced breakdown spark reaching the at least one optical device.

18. The aero-optical instrument of claim 15 further comprising a feedback monitoring cycle used to regulated an energy output of the one or more pulsed lasers to reduce or increase the energy output of the at least one laser so as to control the intensity of the amount of light from the laser-induced breakdown spark reaching the at least one optical device.

19. The aero-optical instrument of claim 15 further comprising:
at least one neutral density filter selectively and moveably positioned between the at least one optical device and the laser-induced breakdown spark, wherein the at least one neutral density filter is moved from a first position to a second position to control the intensity of the amount of light from the laser-induced breakdown spark reaching the at least one optical device; and
a feedback monitoring cycle used to regulated an energy output of the one or more pulsed lasers to reduce or increase the energy output of the at least one laser so as to control the intensity of the amount of light from the laser-induced breakdown spark reaching the at least one optical device.

20. The aero-optical instrument of claim 15 further comprising:
a plurality of neutral density filters between the at least one optical device and the laser-induced breakdown spark wherein at least one of the plurality of neutral density filters is selectively positioned between the and the laser-induced breakdown spark to control the intensity of the amount of light from the laser-induced breakdown spark reaching the at least one optical device; and
a feedback monitoring cycle used to regulated an energy output of the one or more pulsed lasers to reduce or increase the energy output of the at least one laser so as to control the intensity of the amount of light from the laser-induced breakdown spark reaching the at least one optical device.

21. The aero-optical instrument of claim 15 wherein the at least one optical device is a photosensor.

22. The aero-optical instrument of claim 15 wherein the at least one optical device is a position sensing device.

* * * * *